(12) United States Patent
Kurita et al.

(10) Patent No.: US 8,446,528 B2
(45) Date of Patent: May 21, 2013

(54) DISPLAY APPARATUS

(75) Inventors: Toshiyuki Kurita, Yokohama (JP);
Hitoaki Owashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1077 days.

(21) Appl. No.: 12/252,422

(22) Filed: Oct. 16, 2008

(65) Prior Publication Data

US 2009/0102972 A1 Apr. 23, 2009

(30) Foreign Application Priority Data

Oct. 17, 2007 (JP) .................................. 2007-269651

(51) Int. Cl.
*H04N 5/44* (2011.01)

(52) U.S. Cl.
USPC . 348/553; 348/211.99; 375/141; 375/240.02; 382/298

(58) Field of Classification Search ................... 348/553
See application file for complete search history.

(56) References Cited

U.S. PATENT DOCUMENTS

| | | | |
|---|---|---|---|
| 2003/0169370 A1 | 9/2003 | Ejima et al. | |
| 2005/0105007 A1* | 5/2005 | Christian ...................... | 348/731 |
| 2005/0107032 A1 | 5/2005 | Homma et al. | |
| 2005/0288058 A1 | 12/2005 | Chandhok et al. | |
| 2006/0098186 A1* | 5/2006 | Yumiki ........................ | 356/3.07 |

FOREIGN PATENT DOCUMENTS

| | | |
|---|---|---|
| CN | 1993969 A | 4/2007 |
| JP | 2000-032437 | 1/2000 |
| JP | 2004-112459 | 4/2004 |
| JP | 2004-336476 A | 11/2004 |
| JP | 2005-016991 A | 1/2005 |

OTHER PUBLICATIONS

China State Intellectual Property Office (SIPO) office action for SIPO patent application CN200810170524.X (Jun. 12, 2010).
Japan Patent Office office action for application JP2007-269651 (Jul. 10, 2012).

* cited by examiner

*Primary Examiner* — Jung Kim
*Assistant Examiner* — Ayoub Alata
(74) *Attorney, Agent, or Firm* — Kilpatrick Townsend & Stockton LLP

(57) ABSTRACT

A display apparatus transmits a picture acquisition request for getting picture information to an external image apparatus connected through a predetermined interface to the display apparatus from the external image apparatus at predetermined intervals and gets a plurality of pieces of picture information from the external image apparatus to be displayed. The plurality of pictures may be switched at predetermined intervals, for example, to be displayed, so that the plurality of pictures may be displayed in a so-called slide show manner. A plurality of pictures for thumbnail may be produced from the plurality of pieces of picture information and be arranged together to be displayed in one picture screen of a display device.

18 Claims, 17 Drawing Sheets

| no | PICTURE NAME | ELIMINATION LOCK | ROTATION |
|---|---|---|---|
| 1 | PICTURE 1 | ELIMINATION LOCK | 0° |
| 2 | PICTURE 2 | ELIMINATION LOCK | 180° |
| 3 | PICTURE 3 | ELIMINATION PERMITTED | 0° |
| ..... | ................ | ................ | ................ |

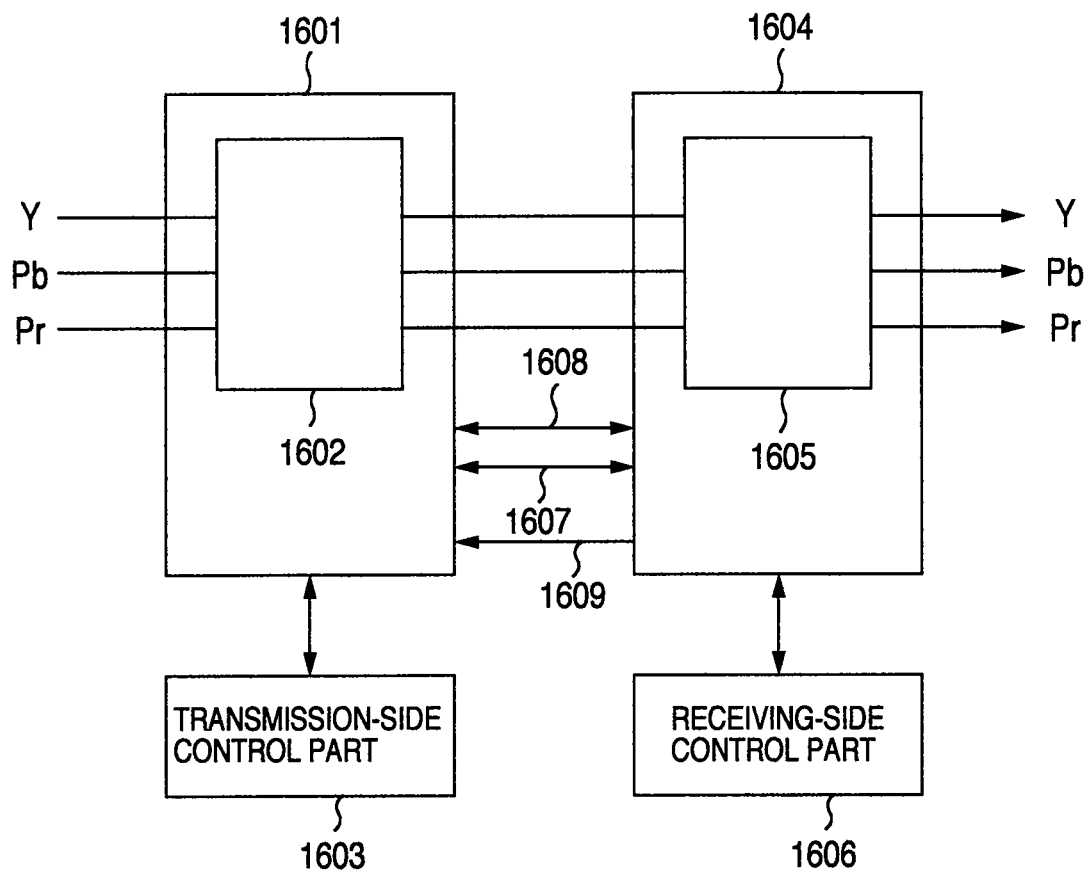

FIG.19

| INTERFACE NUMBER | MAKER CODE | APPARATUS CODE |
|---|---|---|
| 1 | MAKER 1 | APPARATUS CODE 1 |
| 2 | MAKER 2 | APPARATUS CODE 2 |
| 3 | MAKER 3 | APPARATUS CODE 3 |

DISPLAY APPARATUS

INCORPORATION BY REFERENCE

The present application claims priority from Japanese application JP 2007-269651 filed on Oct. 17, 2007, the content of which is hereby incorporated by reference into this application.

BACKGROUND OF THE INVENTION

The present invention relates to a technique for displaying picture information from an image apparatus connected to a display apparatus through an interface in the display apparatus.

In order to connect an image apparatus with an image display apparatus which is another image apparatus to make viewing and listening of picture, a method using analog connection to transmit picture and audio signals is used. However, with the spread of digital apparatuses, a method using digital connection to encrypt picture and audio signals to be transmitted is used from the viewpoint of prevention of deterioration in picture quality and protection of copyright.

The digital transmission using one cable conforming to the IEEE 1394 standard is known as an example thereof. In the digital transmission, mutual authentication is performed between a transmission apparatus and a receiving apparatus and picture and audio signals are multiplexed after the authentication, so that the multiplexed data is subjected to encryption processing named DTCP (Digital Transmission Content Protection) to be transmitted.

As another example, an HDMI (High-Definition Multimedia Interface) system is known. In the HDMI system, a baseband signal of a high definition picture signal and an audio signal are multiplexed in a time-shared manner and are subjected to encryption processing named HDCP (High-bandwidth Digital Content Protection) to be transmitted.

Such conventional technique in which the digitized picture and audio signals are multiplexed to be transmitted is disclosed in US 2003169370A1, for example.

SUMMARY OF THE INVENTION

Since the IEEE 1394 standard is used for a network and has a limited transmission rate at which transmission and receiving can be made, the high definition picture signal having increased information amount cannot be transmitted as it is the baseband signal. Accordingly, the IEEE 1394 standard has a problem that the baseband signal must be compressed to reduce the transmission rate thereof and be transmitted. On the other hand, in the HDMI system, it is not considered that an apparatus which receives the transmitted high definition picture signal records the received signal.

Moreover, these systems are premised on connection between stationary apparatuses installed in homes and it is not sufficiently considered that the image display apparatuses are connected with portable apparatuses such as digital cameras and mobile telephones conveniently.

The present invention has been made in view of the above problems and it is an object of the present invention to provide a technique for improving the convenience in case where picture gotten by a portable image apparatus such as, for example, digital camera and mobile telephone is displayed in a display apparatus.

According to the present invention, a picture acquisition request for getting picture information from an external image apparatus connected through a predetermined interface to a display apparatus is transmitted to the external image apparatus at predetermined intervals, so that a plurality of pieces of picture information can be gotten from the external image apparatus to be displayed.

The plurality of pictures gotten thus may be switched at predetermined intervals, for example, to be displayed, so that the plurality of pictures may be displayed in a so-called slide show manner. Furthermore, a plurality of thumbnail pictures may be produced from the plurality of pieces of picture information to be arranged together in one picture screen of a display device.

According to the present invention, the convenience in case where picture gotten by the portable image apparatus such as, for example, digital camera and mobile telephone is displayed in a display apparatus can be improved.

Other objects, features and advantages of the invention will become apparent from the following descriptions of the embodiments of the invention taken in conjunction with the accompanying drawings.

BRIEF DESCRIPTION OF THE DRAWINGS

FIG. 16 illustrates an configuration example of HDMI interface;

FIG. 17 shows an example of a format of a remote-control code;

FIG. 19 is a table showing an example of maker codes and apparatus codes corresponding to interfaces stored in the image display apparatus 200.

DETAILED DESCRIPTION OF THE EMBODIMENTS

Preferred embodiments of the present invention are now described with reference to the accompanying drawings.

Embodiment 1

Figure 1:
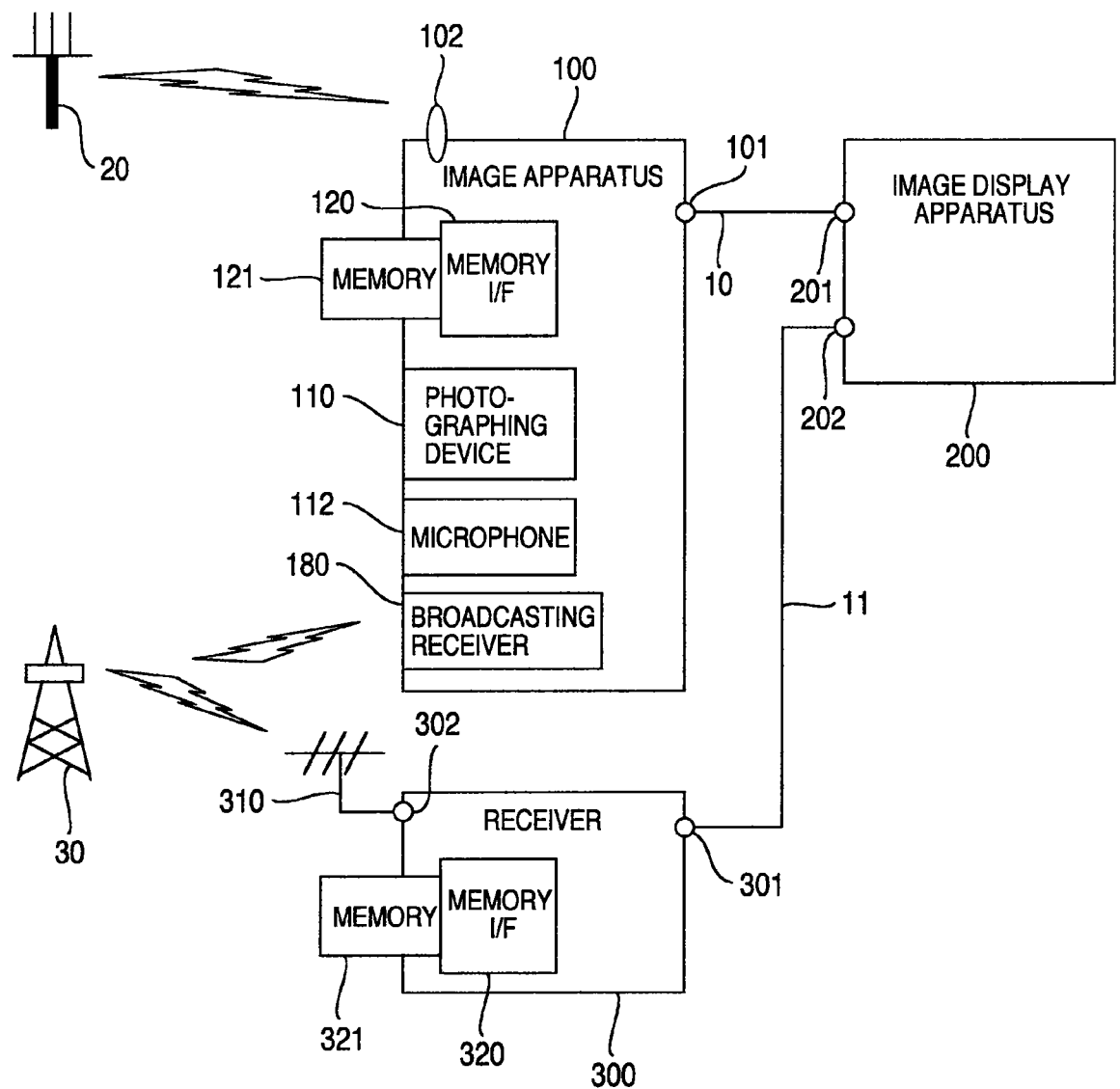
FIG. 1 is a schematic diagram illustrating an embodiment of the present invention.

FIG. 1 illustrates a first embodiment of the present invention. In FIG. 1, 3 image apparatuses are shown by way of example. One is an image apparatus 100 of, for example, portable type capable of receiving a digital broadcast signal transmitted from a base station antenna 20 of mobile telephones or a broadcasting transmission tower 30, another is an image display apparatus 200 and still another is a receiver 300 such as, for example, a tuner capable of receiving the digital broadcast signal transmitted from the broadcasting transmission tower 30. The image apparatus 100 and the image display apparatus 200 are connected through, for example, bidirectional interface 10 and the image display apparatus 200 and the receiver 300 are connected through another bidirectional interface 11. Thus, bidirectional communication of picture signal and other information and signal between the apparatuses can be attained.

In the embodiment, the portable image apparatus 100 contains digital camera, video camera, mobile telephone, game machine, personal media player and the like, concretely. The requisite constituent elements thereof are not necessarily identical in accordance with the respective aspects, although the embodiment shown in FIG. 1 mainly contains constituent elements requisite for input/output to external apparatuses.

In FIG. 1, the base station antenna 20 of the mobile telephones and an antenna 102 of the image apparatus 100 make transmission and reception of signal. When the image apparatus 100 is used as mobile telephone, the image apparatus 100 performs signal processing as usual mobile telephone. Furthermore, the image apparatus 100 can also receive content such as movie transmitted from the base station antenna 20 of mobile telephone. In this case, the content can be also viewed and listened by a display device and an audio output device included in the image apparatus 100 or by a large display screen of an external image display apparatus 200 through a terminal 101, a connection cable 10 and a terminal 201. Moreover, the content can be stored in a storage medium included in the image apparatus 100 or in a storage medium (for example, memory 121) connected to the image apparatus 100 while being viewed and listened or in order to make viewing and listening of the content later. The memory 121 can be used as a recording medium for recording movie and the like.

Similarly, a program broadcasted from the broadcasting transmission tower 30 can be received by a broadcasting receiver 180 of the image apparatus 100 to be viewed and listened by the image apparatus 100 and can be recorded in a storage medium (not shown) included in the image apparatus 100 or in a storage medium (for example, memory 121) connected to the image apparatus 100. Further, the program can be viewed and listened by the image display apparatus 200 through the terminal 101, the connection cable 10 and the terminal 201.

Furthermore, the program broadcasted from the broadcasting transmission tower 30 can be received by a receiving antenna 310 connected to the receiver 300 to be inputted to the receiver 300 through an antenna terminal 302 and is subjected to proper signal processing to be viewed and listened by the image display apparatus 200 through a terminal 301, a connection cable 11 and a terminal 202. Another program selected at the same time as the viewing and listening or differently from the viewed and listened program can be also stored in a storage medium (not shown) included in the receiver or in a memory 321 through a memory interface 320. The memory 321 included in the receiver 300 and in which the program is stored can be connected to a memory interface 120 of the image apparatus 100. When the image apparatus 100 is taken out of the home and the program stored in the memory 321 is displayed in a display apparatus (not shown) included in the image apparatus 100, the program recorded in the home can be viewed and listened outside of the home.

Moreover, a photographing device 110 and a microphone 112 can be mounted in the image apparatus 100, so that still picture and moving picture can be photographed together with voice by the photographing device and the microphone and can be stored in a storage medium (not shown) included in the image apparatus 100 or the memory 121 properly. The picture and voice stored in the included storage medium or memory 121 can be viewed and listened by the image display apparatus 200 through the terminal 101, the connection cable 10 and the terminal 201.

In the embodiment shown in FIG. 1, wired cables for the connection cables 10 and 11 are connected between the terminal 101 of the image apparatus 100 and the terminal 201 of the image display apparatus 200 and between the terminal 301 of the receiver 300 and the terminal 201 of the image display apparatus 200, respectively. However, when transmission and reception of signal are made between the image apparatuses, it is not necessary to connect therebetween by means of wired cables and connection therebetween may be made by radio. The connection by radio can eliminate troublesomeness in wiring and arrangement of wiring. The method using the connection cable has the merit of being strong to interference such as noise as compared with the connection by radio.

Figure 2:
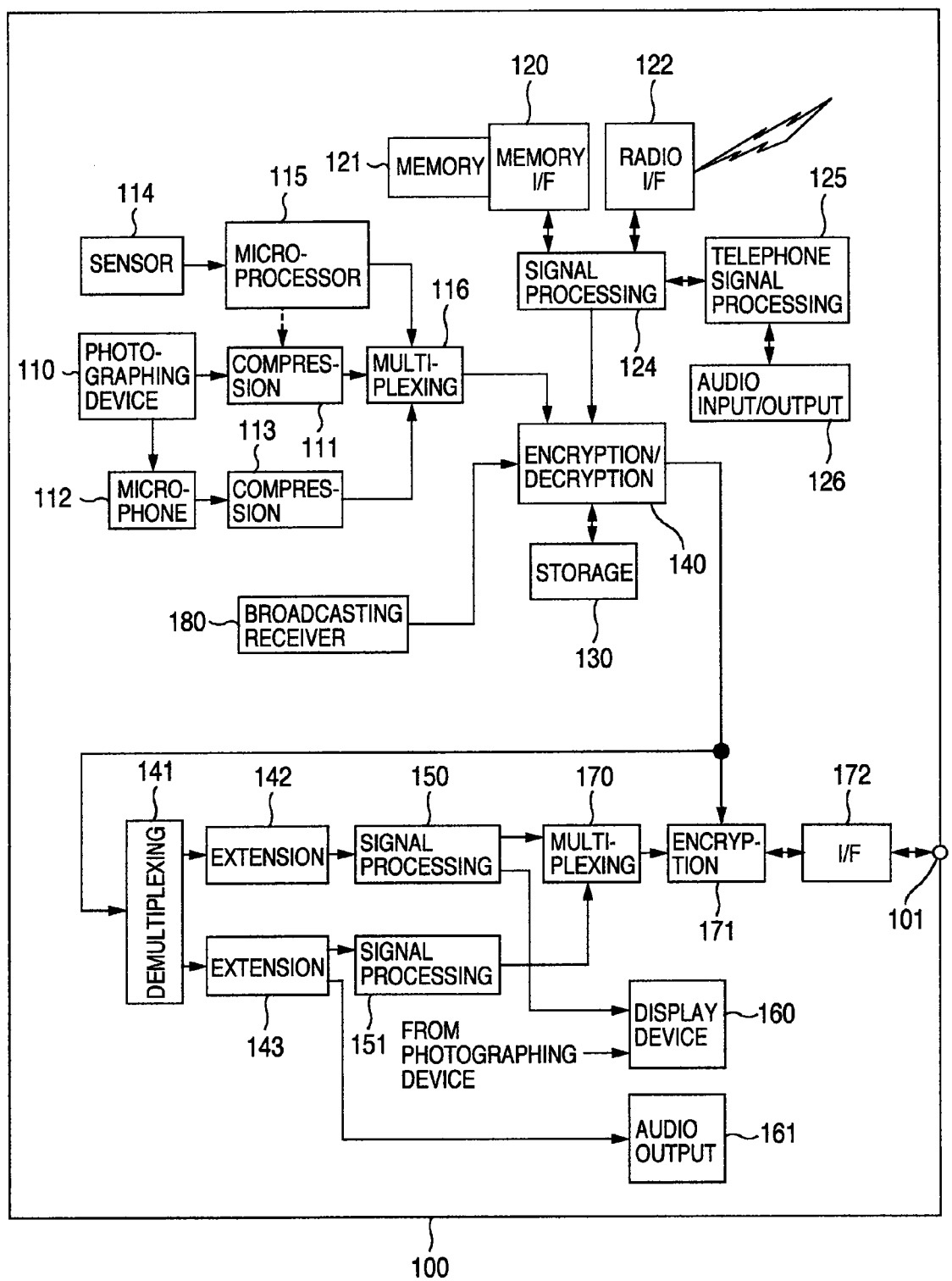
FIG. 2 is a block diagram schematically illustrating an example of an image apparatus 100 according to an embodiment of the present invention.

FIG. 2 illustrates a concrete configuration of the image apparatus 100 of FIG. 1 according to the first embodiment of the present invention. In FIG. 2, the photographing device 110 takes in moving picture and still picture inputted through an optical system to be converted into electrical signals. A compression circuit 111 uses a compression system such as, for example, MPEG2, MPEG4 or AVC/H.264 for the moving picture and further uses a compression system such as, for example, JPEG for the still picture to bit-compress the taken-in pictures efficiently.

On the other hand, the microphone 112 converts sound wave into electrical signal. A compression circuit 113 uses a compression system such as, for example, MPEG audio to bit-compress the taken-in audio signal efficiently.

When still picture is taken by the image apparatus 100, the image apparatus is rotated to take a lateral position or longitudinal position in accordance with an object to be taken so that the picture is taken. A sensor 114 detects that the image apparatus 100 is used in the lateral position or the longitudinal position for photographing. When the image apparatus 100 is used in the longitudinal position, the sensor 114 detects simultaneously whether the right side or the left side of the image apparatus 100 is up. Information detected by the sensor 114 is supplied to a microprocessor 115.

A multiplexing circuit 116 is supplied with the bit-compressed picture signal and audio signal from the compression circuits 111, 113 and various information from the microprocessor 115 and multiplexes them in accordance with a predetermined format. When still picture is taken, the audio signal may be multiplexed in synchronism with photographing of the still picture, although the audio signal is not taken in usually.

The various information from the microprocessor 115 contains position information (lateral position, right side in longitudinal position and left side in longitudinal position) detected by the sensor 114, date, exposure information upon photographing and the like.

Figure 3A:
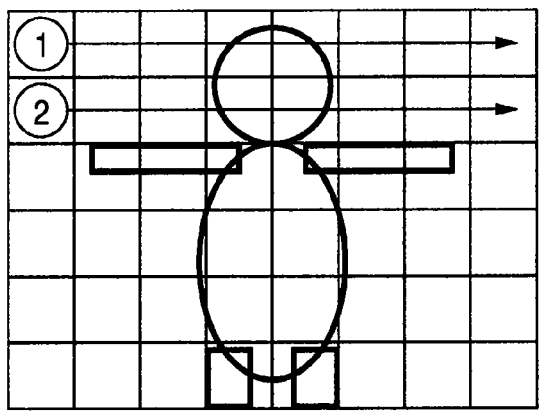
FIGS. 3A to 3E show the order of processing of compressed signal.
Figure 3B:
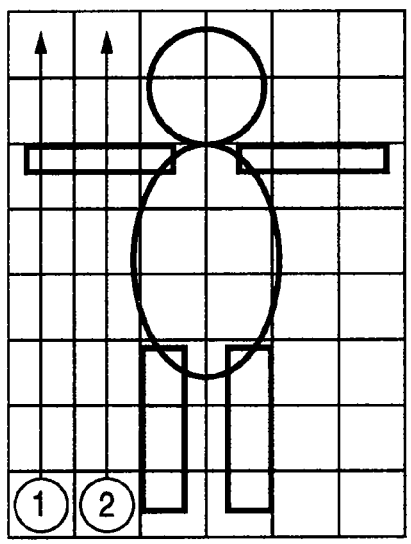
Figure 3C:
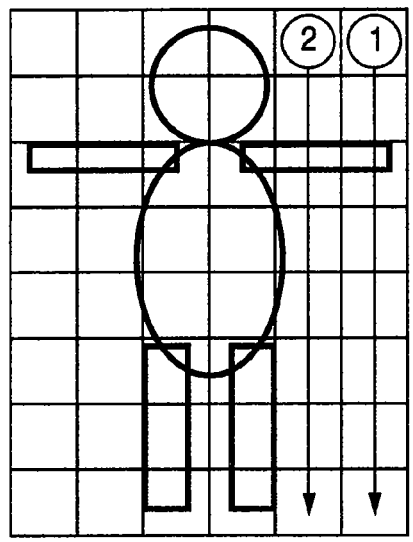

FIGS. 3A to 3E show the order of signal processing for each block performed by picture compression generally. As shown in FIG. 3A, the signal processing is performed in order from left to right of an uppermost line or first line of a picture and then performed in order from left to right of a second line of the picture. As shown in FIG. 3B, when the image apparatus 100 is set in the longitudinal position with the right side thereof up, the signal processing is performed from lower side to upper side of a leftmost column and then performed from lower side to upper side of a second column from the left. As shown in FIG. 3C, when the image apparatus 100 is set in the longitudinal position with the left side thereof up, the signal processing is performed from upper side to lower side of a rightmost column and then performed from upper side to lower side of a second column from the right.

When the image apparatus 100 is set in the longitudinal position upon photographing, the photographed picture cannot be displayed in the display device as it is photographed when there is no information indicating which of right or left is up. Accordingly, the position information is multiplexed on the picture signal and audio signal as various information from the microprocessor 115. The compressed signal is extended and the extended picture is subjected to the signal processing of 90-degree rotation using the position information to match output of the display device, so that the picture can be displayed as it is photographed.

Figure 3D:
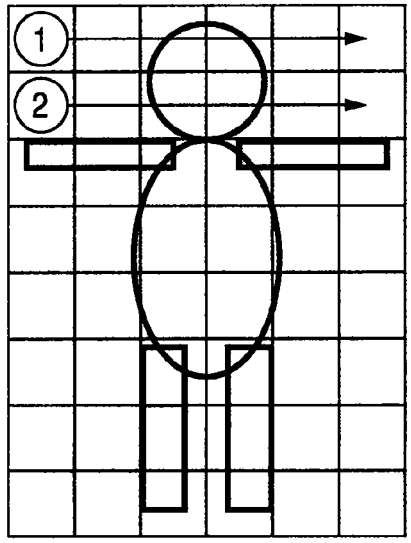
Figure 3E:
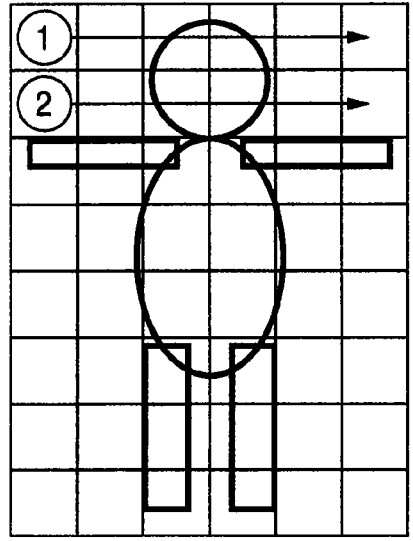

Moreover, instead of multiplexing the position information, the microprocessor 115 supplies the position information to the compression circuit 111 to control the compression circuit 111 as shown by dotted line directed from the microprocessor 115 to the compression circuit 111 in FIG. 2. Thus, the compression circuit 111 can process the compression signal in accordance with photographing operation of picture and photographing position of the image apparatus 100 to thereby eliminate rotation processing upon reproduction of picture. For example, as shown in FIGS. 3D and 3E, processing of compression signal can be performed from left to right of the upper line of the picture upon photographing and then from left to right of the second line on the basis of the position information, so that the picture can be displayed upon reproduction as it is photographed.

When the image apparatus 100 can photograph both of still picture and moving picture, the still picture is photographed in the lateral position or in the longitudinal position as described above. Similarly, there is a user who considers using the image apparatus 100 in the longitudinal position even in case of photographing of moving picture.

The signal processing of rotation is not generally provided for moving picture and when the moving picture is displayed by the image display apparatus 200 as it is, the picture rotated laterally is displayed to result in photographing unintended for the user.

Accordingly, when the user rotates the image apparatus 100 to use it in case where the user takes photograph in a moving picture mode, the sensor 114 detects that the image apparatus 100 is used in the longitudinal position and the microprocessor 115 displays a message to call user's attention in a display device 160. The display device 160 is used as a monitor of picture being photographed by the photographing device 110 and the user can confirm the message easily while photographing, so that when it is not intended, user's attention is called so that the user changes the photographing position to the usual lateral position.

Further, simultaneously, when the image apparatus is used in the longitudinal position, the microprocessor 115 sends position information to the compression circuit 111 to control the compression circuit 111. Thus, the compression circuit 111 performs the compression signal processing from left to right of the uppermost line in the longitudinal position as shown in FIGS. 3D and 3E, for example, so that picture can be reproduced in accordance with photographing operation of the picture and photographing position of the image apparatus 100. Consequently, the picture can be viewed in the longitudinal position even by a current television set. Detailed description thereof is made later.

In FIG. 2, the signal multiplexed by the multiplexing circuit 116 is stored in a storage device 130 through an encryption/decryption circuit 140. The storage device can use, for example, hard disk device, optical disc device, semiconductor memory device and the like and which storage device is used may be decided in consideration of desired memory capacity, size, ease of taking out a storage medium and price. Moreover, the signal may be stored in the memory 121 through a signal processing circuit 124 and the memory interface 120.

Since a photographer has the copyright on information photographed by the photographer personally, the information is not required to be encrypted usually when it is stored. However, since there is a possibility that the information stored in the storage device 130 is lost, an output signal of the multiplexing circuit 116 is encrypted by the encryption/decryption circuit 140 and then stored in the storage device 130 or the memory 121, so that the stability can be enhanced.

The image apparatus 100 can sometimes accept a removable memory and sometimes has the mobile telephone function and the radio LAN (Local Area Network) function. The memory interface 120 is an interface for the removable memory 121. Still picture, moving picture and audio content can be recorded in the memory 121 by means of another apparatus and the memory 121 can be connected to the interface 120, so that the content recorded in the memory 121 can be recorded in the storage device 130 through the signal processing circuit 124 and the encryption/decryption circuit 140.

At this time, the signal processing circuit 124 detects whether the content recorded in the memory 121 is copyrighted and a copy thereof is limited or not and the content is encrypted by the encryption/decryption circuit 140 in accordance with conditions to be moved to the storage device 130.

Similarly, even when still picture, moving picture and audio content are received by a radio interface 122 and inputted to the image apparatus 100, the still picture, moving picture and audio content are recorded in the storage device 130 through the signal processing circuit 124 and the encryption/decryption circuit 140. Even in this case, the still picture, moving picture and audio content are encrypted by the encryption/decryption circuit 140 in accordance with the protection of copyright for content and conditions of limitation of copy if necessary.

When the content stored in the storage device 130 is reproduced to be viewed and listened, an input key or a remote-control device not shown is used to select the content desired to be viewed and listened and the selected content is read out from the storage device 130. The read-out content is decrypted by the encryption/decryption circuit 140 and are divided into picture signal and audio signal by a demultiplexing circuit 141.

Furthermore, when broadcast is received by the broadcasting receiver 180, the received broadcast encrypted for broadcasting is decrypted by the encryption/decryption circuit 140 and is then subjected to encryption processing for storage by the encryption/decryption circuit 140 if necessary to be stored in the storage device 130 or the memory 121. When received broadcast is viewed and listened directly, the received broadcast is divided into picture signal and audio signal by the demultiplexing circuit 141.

The divided and compressed picture signal is extended by an extension circuit 142 and inputted to a signal processing circuit 150. The signal processing circuit 150 converts scanning lines thereof in synchronism with scanning lines of the display device 160 and supplies the picture signal to the display device 160.

The divided and compressed audio signal is extended by an extension circuit 143 and inputted to an audio output device 161. In this manner, since the image apparatus 100 includes the display device 160 and the audio output device 161, the image apparatus 100 can make viewing and listening of picture and sound without connecting the image display apparatus externally. When there is any time difference in picture display and audio output due to difference in time required for the extension processing of the picture signal and the audio signal and the presence of the conversion processing of scanning lines, the feeling of wrongness is caused. Since the feeling of wrongness is increased when it takes time to perform the picture signal processing and the audio signal precedes the picture signal, the audio signal is delayed in the extension processing, for example, so that a so-called lip synchronization is performed. Thus, the feeling of wrongness due to deviation or shift of the picture signal and the audio signal can be eliminated.

In contrast, when the picture signal and the audio signal are viewed and listened by the external image display apparatus 200, the scanning lines treatable by the image display apparatus 200 are confirmed and when the scanning lines coincide with the scanning lines of the picture signal to be displayed, the picture signal is outputted as it is. When both of the scanning lines are different, the signal processing circuit 150 converts the scanning lines of the picture signal into requisite scanning lines and a multiplexing circuit 170 then multiplexes the time axis of the audio signal processed by the signal processing circuit 151. The signal processing circuit 151 compresses the audio signal in time axis during the period corresponding to the blanking period of the picture signal and performs time adjustment for lip synchronization if necessary. The picture signal and the audio signal multiplexed by the multiplexing circuit 170 are supplied to an encryption circuit 171 to be subjected to encryption processing required to be transmitted between the image apparatus 100 and the image display apparatus 200, so that the picture signal and the audio signal are supplied to the image display apparatus 200 through an interface 172 and the terminal 101.

As described above, when the image apparatus 100 is used in the longitudinal position in spite of moving picture and the compression signal processing is performed as shown in FIGS. 3D and 3E, the signal processing circuit 150 converts the scanning lines into scanning lines in number capable of being photographed by image display apparatus 200. In this case, parts where picture is not displayed are produced on right and left sides of the display screen. The picture is displayed in the display device 160 in a so-called side-panel state.

Further, when the signal outputted from the terminal 101 is stored in a receiving side thereof, the compressed signal is outputted without extending the compressed signal. In this case, the compressed signal is inputted to the encryption circuit 171 from the encryption/decryption circuit 140 to be subjected to encryption required for transmission and is outputted through the interface 172 and the terminal 101.

In the foregoing description, the picture signal and the audio signal taken in from the microphone 112 and the content inputted from the memory 121 and the radio interface 122 are once stored in the storage device 130 and then reproduced. However, when the storage is not necessary or when direct viewing and listening are made, the picture and signals may be processed by the demultiplexing circuit 141 without performing encryption and encryption/decryption processing for storage in the encryption/decryption circuit 140. In this manner, the display device 160 and the audio output device 161 included in the image apparatus 100 can be used to make viewing and listening of picture and voice or the picture and voice can be viewed and listened by the receiver connected externally through the output interface 172.

Figure 4:
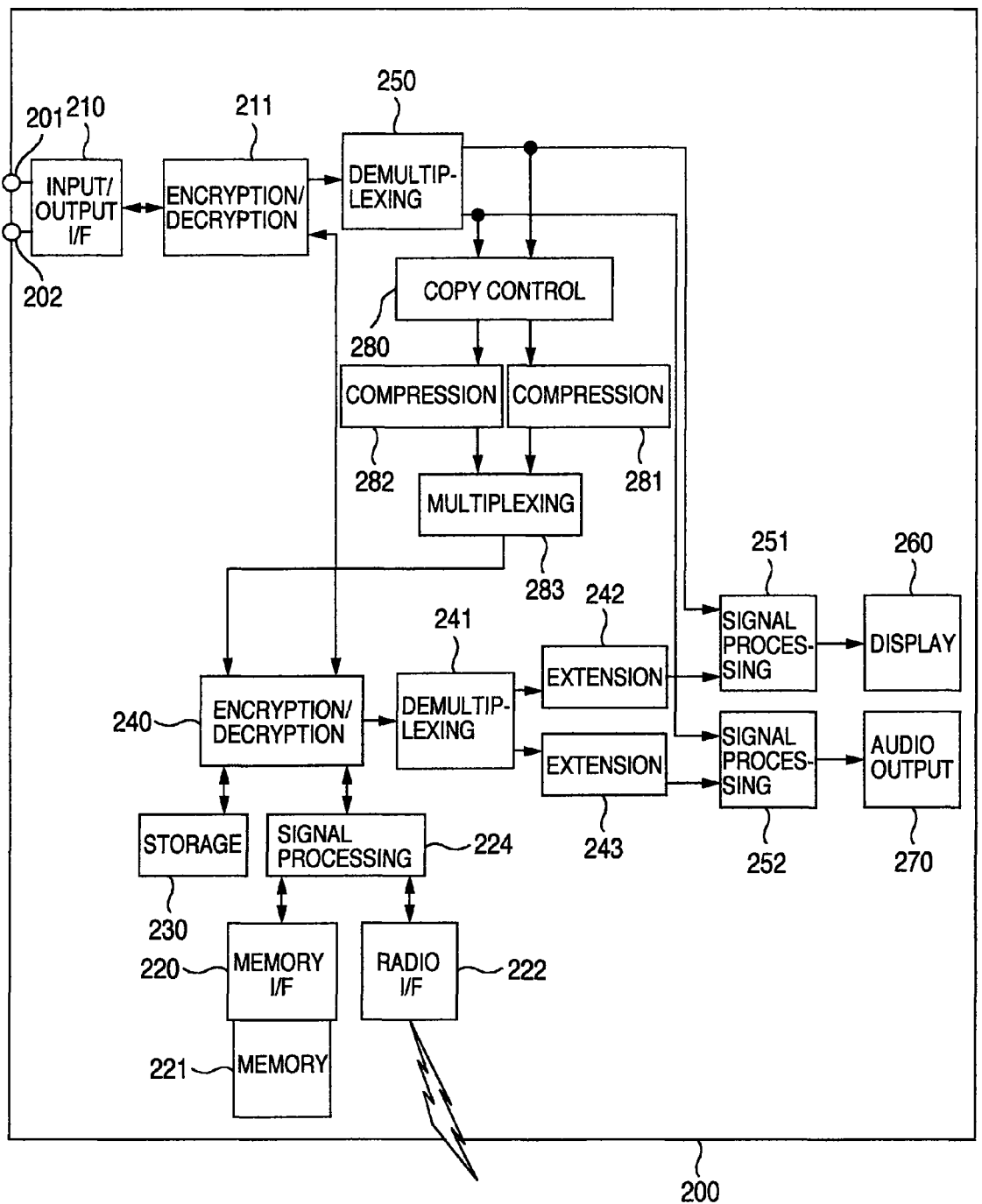
FIG. 4 is a block diagram schematically illustrating an example of an image display apparatus 200 according to an embodiment of the present invention.

FIG. 4 illustrates concrete configuration of the image display apparatus 200 shown in FIG. 1. The like elements are designated by the like reference numeral and description thereof is omitted.

First, description is made to the case where a signal inputted from the terminal 201 or 202 is a baseband signal of uncompressed moving picture. The signal inputted from the terminal 201 or 202 is supplied to an encryption/decryption circuit 211 through an input/output interface 210. The encryption/decryption circuit 211 makes encryption corresponding to that of the encryption circuit 171 shown in FIG. 2 and decrypts the signal encrypted by the encryption circuit 171. The decrypted signal is supplied to a demultiplexing circuit 250 and the picture and audio signals are supplied to signal processing circuits 251 and 252, respectively. The signal processing circuit 251 performs conversion of scanning lines and resolution in accordance with the number of pixels capable of being displayed in a display 260. The signal processing circuit 252 extends the time axis of the audio signal multiplexed by compressing the time axis during the blanking time of the picture signal and subjects the audio signal to the lip synchronization and the sound quality adjustment if necessary. The output signals of the signal processing circuits 251 and 252 are supplied to the display 260 and an audio output device 270 to be viewed and listened.

Next, description is made to the case where the compressed moving picture signal is inputted from the terminal 201 or 202. The purpose of inputting the compressed signal is to store the moving picture signal in a storage device 230 included in the image display apparatus 200.

The signal inputted from the terminal 201 or 202 is supplied to the encryption/decryption circuit 211 through input/output interface 210. The encryption/decryption circuit 211 makes encryption corresponding to that of the encryption circuit 171 shown in FIG. 2 and decrypts the signal encrypted by the encryption circuit 171. The decrypted signal is supplied to an encryption/decryption circuit 240. The encryption/decryption circuit 240 reads out copy control information of the content to be stored and performs encryption processing for storage in accordance with the copy control information. The encrypted signal is inputted to the storage device 230 to be stored as it is compressed.

When viewing and listening are performed while storing the compressed signal inputted from the terminal 201 or 202, the signal corresponding to the compressed signal decrypted by the encryption/decryption circuit 211 is inputted to a demultiplexing circuit 241 from the encryption/decryption circuit 240. Then, the demultiplexing circuit 241 divides the signal into the compressed picture and audio signals. The divided picture and audio signals are extended by extension circuits 242 and 243, respectively, to be returned to baseband signals and then supplied to signal processing circuits 251 and 252. Similarly, the picture and audio signals are supplied to the display 260 and the audio output device 270, respectively, to be viewed and listened.

When the content stored in the storage device 230 is reproduced to be viewed and listened, title of the content stored in the storage device 230 is displayed in the display to be selected and signal of the selected content is inputted to the encryption/decryption circuit 240 from the storage device 230. The signal of the selected content is decrypted by the encryption/decryption circuit 240 to be supplied to the demultiplexing circuit 241. The similar processing is then performed so that the content can be viewed and listened.

Similarly, the content stored in a memory 221 can be also reproduced. Similarly to reproduction of the content stored in the storage device 230, the content desired to be viewed and listened is selected from the contents stored in the memory 221 and the selected content is supplied to the encryption/decryption circuit 240 through a signal processing circuit 224. The signal processing circuit 224 performs processing required to read out the content from the memory 221 and supplies the compressed and multiplexed picture and audio signals to the encryption/decryption circuit 240. Subsequent signal processing is the same as the case where the content is read out from the storage device 230.

Moreover, the content can be also stored in the memory 221 in the same manner as the case where the content is stored in the storage device 230. Detailed description of the processing in this case is omitted, although the content encrypted by the encryption/decryption circuit 240 is stored in the memory 221 through the signal processing circuit 224 and memory interface 220.

Even when the content transmitted by radio is viewed and listened and stored, the same processing is performed. The compressed content transmitted by radio is inputted to the encryption/decryption circuit 240 through a radio interface 222 and the signal processing circuit 224. The encryption/decryption circuit 240 decrypts the content subjected to encryption processing required for radio transmission. The subsequent processing is the same as the reproduction processing from the storage device 230.

Even when the uncompressed baseband signal is inputted from the terminal 201 or 202, the content can be stored in the storage device 230 or the memory 221 efficiently. The operation in this case is now described.

The content inputted from the terminal 201 or 202 is divided into picture signal and audio signal through the input/output interface 210, the encryption/decryption circuit 211 and the demultiplexing circuit 250. The divided picture signal and audio signal are inputted to compression circuits 281, 282 through a copy control circuit 280. The copy control circuit 280 reads out copy control information multiplexed on the inputted content to judge whether the content can be copied or not. The copy control information may be a bit assigned to a designated part or may be multiplexed on the picture or audio information itself by means of the digital watermarking technique.

The compression circuit 281 compresses the picture signal by means of the compression system such as, for example, MPEG2, MPEG4 and AVC/H.264. Further, the compression circuit 282 compresses the audio signal by means of the compression system such as, for example, MPEG audio. The compressed picture and audio signals are supplied to a multiplexing circuit 283 to be multiplexed and are then supplied to the encryption/decryption circuit. The subsequent operation is the same as above and the signals can be stored in the storage device 230 or the memory 221. Thus, the content can be recorded for a long time in accordance with copyright information efficiently.

Figure 6:
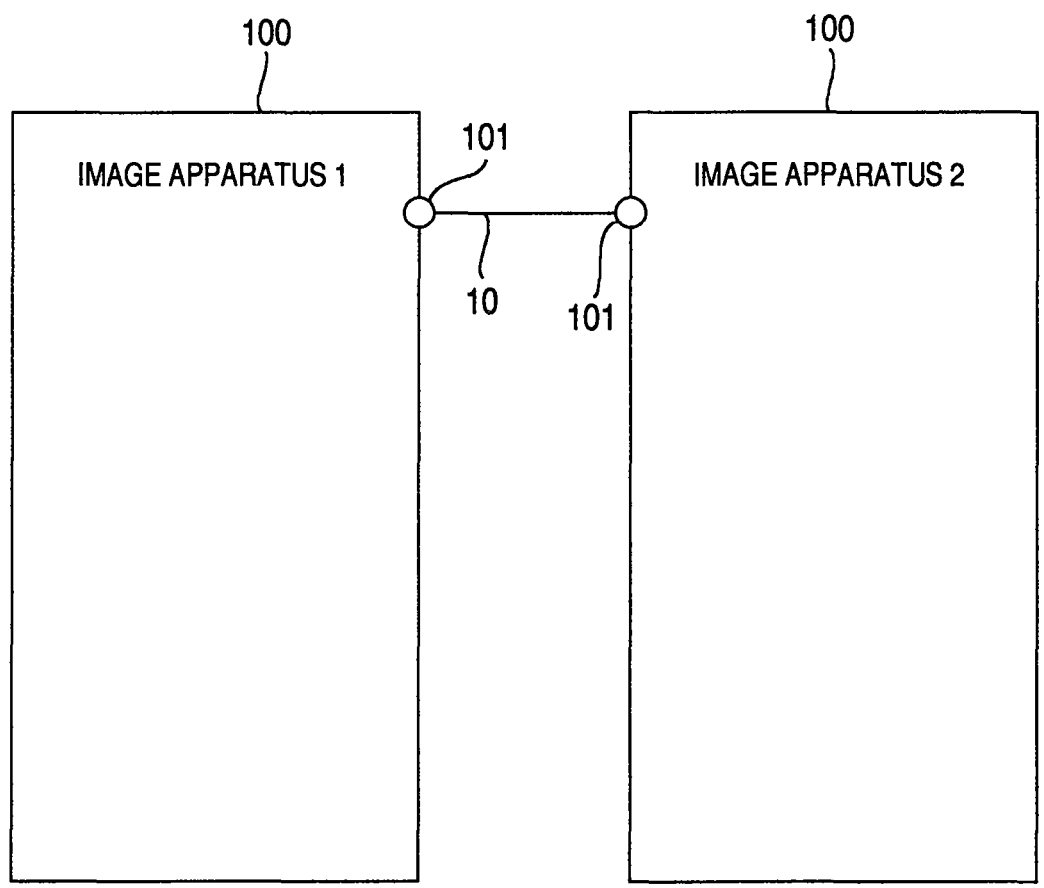
FIG. 6 is a schematic diagram illustrating an example of a system including two image apparatus connected to each other.

In the embodiment described so far, description has been made to the case where the picture and audio signals outputted from the image apparatus 100 are transmitted to the image display apparatus. Furthermore, the case where two image apparatuses 100 are connected to each other in the embodiment is now described with reference to FIG. 6. In FIG. 6, image apparatuses 1 and 2 are both constructed by the image apparatus 100 of the portable type such as, for example, mobile telephone and digital camera. A connection cable 10 which is a bidirectional interface connects between respective terminals 101. With such configuration, the content such as movie transmitted from the base station antenna 20 of mobile telephone and received by the image apparatus 1 can be transmitted to the image apparatus 2 through the connection cable 10 and can be displayed in the display device 160 of the image apparatus 2. Further, the audio output device 161 of the image apparatus 2 can be used to output the audio signal. Moreover, when the content stored in the storage device 130 of the image apparatus 1 is transmitted, desired content can be read out from the storage device 130 on the basis of control signal from the image apparatus 2 and can be decrypted by the encryption/decryption circuit 140. Then, the encryption circuit 171 subjects the content to encryption processing required to transmit the content externally and then the content is outputted through the interface 172 and the terminal 101. Control signals from the image apparatus 2 at this time contain mutual authentication for confirming that the image apparatuses 1 and 2 are regular apparatuses, synchronous control signal for synchronizing with signal processing, transmission request signal and identification signal indicating the image apparatus 1. Furthermore, the control signal is also transmitted from the image apparatus 1 to the image apparatus 2.

The signals which are transmitted and received between the image apparatuses 1 and 2 may be not only signal received from the base station antenna 20 of mobile telephone but also broadcast wave received from the broadcasting receiver 180, content stored in the storage device 130 and content stored in the memory 121.

The image apparatuses 1 and 2 are the same image apparatus 100, for example. The image apparatuses are connected to each other by means of the bidirectional interface as described above. Information such as picture and audio signals is transmitted from the image apparatus 1 to the image apparatus 2 and conversely information such as picture and audio signals is also transmitted from the image apparatus 2 to the image apparatus 1. The direction of transmitting information from the image apparatus 1 to the image apparatus 2 is defined to "up" and conversely the direction of transmitting information from the image apparatus 2 to the image apparatus 1 is defined to "down". It is a matter of course that opposite directions are defined to "up" and "down". The bidirectional interface for connecting the image apparatuses 1 and 2 to each other has asymmetric transmission rates in up and down directions, that is, the transmission rates are different in up and down directions. When information such as picture and audio signals of wide band is transmitted in the up direction, that is, from the image apparatus 1 to the image apparatus 2, a control signal of narrow band (as compared with picture and audio signals) is transmitted from the image apparatus 2 to the image apparatus 1. To the contrary, when information such as picture and audio signals is transmitted in the down direction, that is, from the image apparatus 2 to the image apparatus 1, a control signal of narrow band is transmitted from the image apparatus 1 to the image apparatus 2. Accordingly, the transmission rate in the direction of transmitting picture and audio signals of wide band is set to be high whereas the transmission rate in the direction of transmitting the control signal of narrow band is set to below. In this manner, in the embodiment, since information and signal having different bands in the up and down directions are transmitted between a plurality of different image apparatuses, the picture signal requiring the wide band for transmission and the control signal capable of being transmitted in the narrow band can be used in the limited frequency band simultaneously, so that the use efficiency of radio waves is improved. Further, the control signal is transmitted not only from one apparatus but also from the opposite apparatus if necessary.

Figure 7:
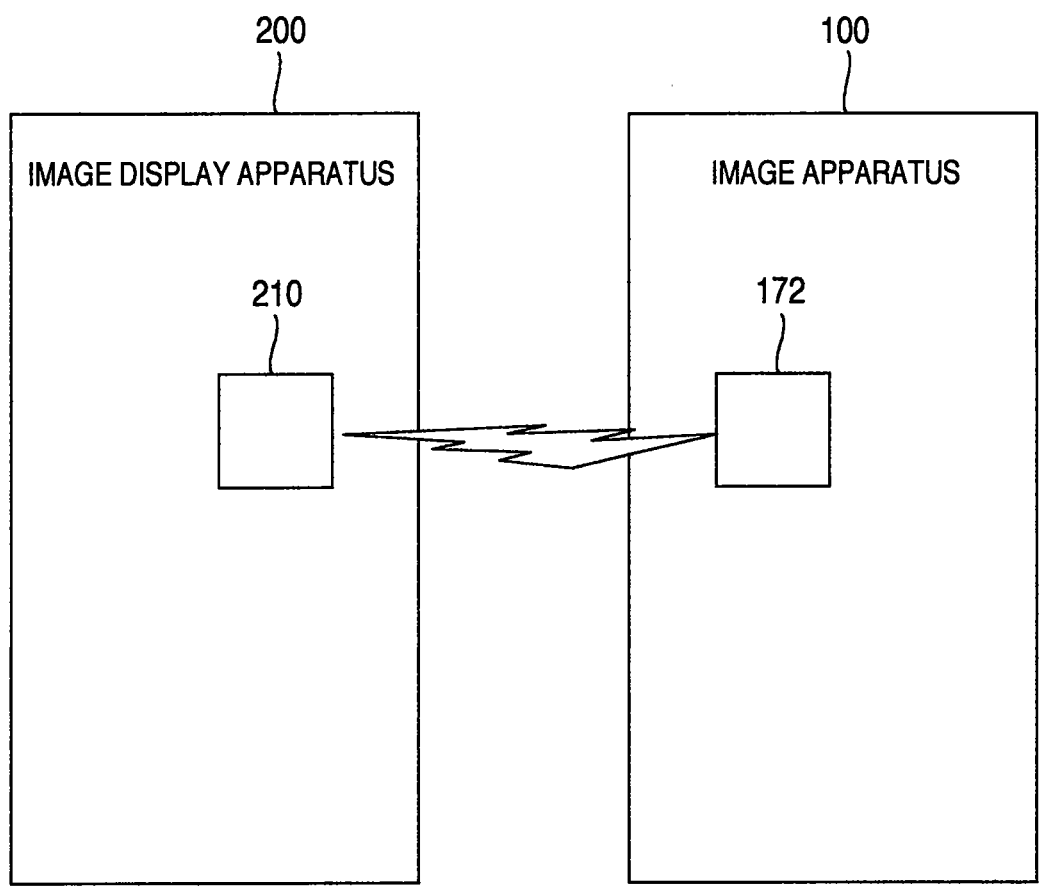
FIG. 7 is a schematic diagram illustrating an example of a system including an image display apparatus and an image apparatus connected to each other.

FIG. 7 illustrates a schematic diagram of the image display apparatus 200 and the image apparatus 100 connected by radio in the first embodiment. In FIG. 7, for simplification of description, other elements except the input/output interface 210 and the interface 172 are not shown. In this manner, the bidirectional interface for connecting the image apparatuses to each other is not limited to wired cable and the bidirectional interface may be constructed by radio. In this case, the degree of freedom for disposition of apparatuses is increased.

Figure 8:
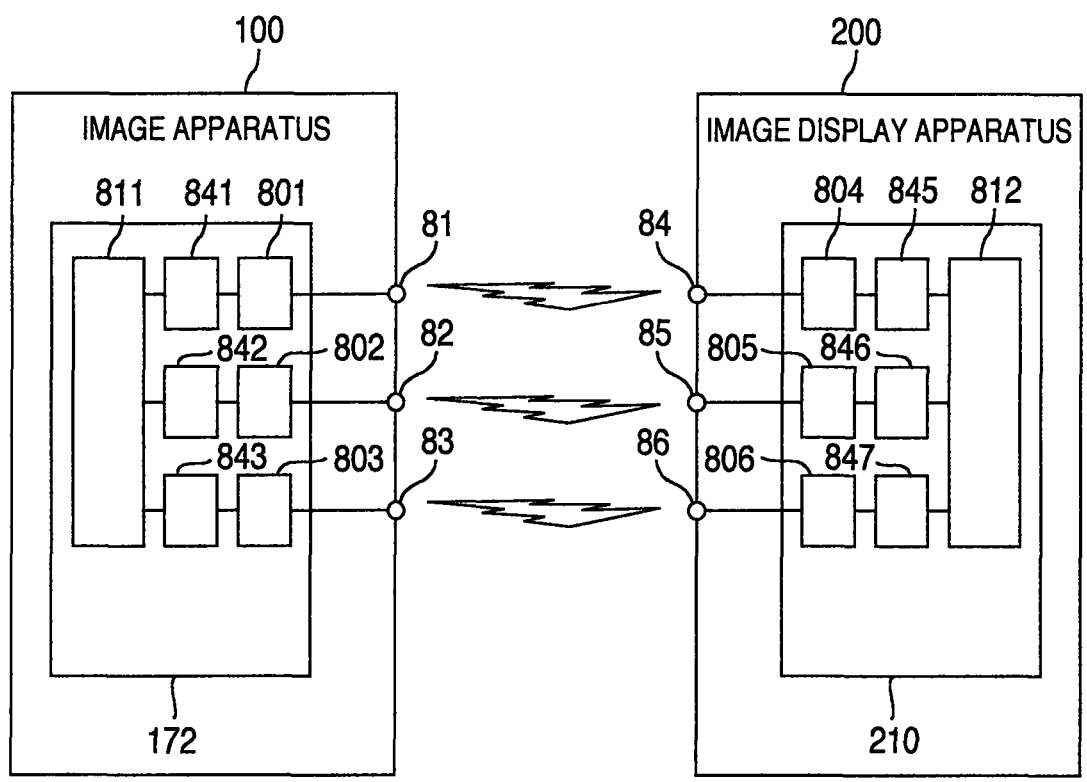
FIG. 8 is a schematic diagram illustrating an example of a system including two image apparatuses connected to each other by radio.

FIG. 8 illustrates the image apparatus 100 and the image display apparatus 200 connected by radio. In FIG. 8, the image apparatus 100 and the image display apparatus 200 are the same as those shown in FIGS. 1 and 2. For simplification of description, in FIG. 8, the only interface circuit 172 is shown as constituent elements of the image apparatus 100 and other constituent elements are not shown. Furthermore, the only input/output interface 210 is shown for the image apparatus 200 and other constituent elements are not shown. The interface circuit 172 and the input/output interface 210 are both the bidirectional interface and have asymmetric transmission rates in the up and down directions similarly to the above. In FIG. 8, channels for transmitting picture signal, audio signal and control signals indicating protection of copyright for content and restriction conditions of copy are formed between antennas 81 and 84 and between antennas 82 and 85. In contrast, the channel between antennas 83 and 86 is to transmit an inter-apparatus control signal.

Moreover, bit selection circuits 811 and 812 are supplied with picture signal, audio signal, control signals indicating protection of copyright for content and restriction conditions of copy and inter-apparatus control signal. In regard to the above-mentioned modulation/demodulation system, the QPSK modulation/demodulation system has high tolerance to transmission error as compared with the 64-QAM modulation/demodulation system. On the other hand, in regard to the transmission efficiency, the 64-QAM modulation/demodulation system has the efficiency higher than the QPSK modulation/demodulation system. Description is made to the case where picture and audio signals and control signals indicating protection of copyright for content and restriction conditions of copy are transmitted from the image apparatus 100 to the image display apparatus 200. The direction of transmitting information from the image apparatus 100 to the image display apparatus 200 is defined to be up and conversely the direction of transmitting information from the image display apparatus 200 to the image apparatus 100 is defined to be down.

In order to make the image apparatus 100 transmit information, a carrier wave detection circuit (not shown) examines whether use channels are already occupied by other apparatuses or not. Detection of carrier wave is performed by detecting whether the carrier wave exists in a predetermined frequency band during a predetermined period or not. When the carrier wave detection circuit detects that other apparatuses use the channels, the carrier wave detection circuit examines an idle state of channel again after a while. Thereafter, when the detection circuit detects that the channel is not used by other apparatus, the detection circuit notifies the microprocessor 115 of the image apparatus 100 that the channel is empty. The microprocessor 115 outputs a channel use request signal as the inter-apparatus control signal through a QPSK modulation/demodulation circuit 803 to ensure the use right of the channel. Then, the microprocessor 115 sends a transmission request signal to the bit selection circuit 811. An error control circuit 843 adds error control bit for detection and correction of error to the transmission request signal to be transmitted to the QPSK modulation/demodulation circuit 803. The QPSK modulation/demodulation circuit 803 subjects signal to QPSK modulation and transmits radio signal to the image display apparatus 200 through the antenna 83. On the other hand, the image display apparatus 200 subjects the radio signal received by the antenna 86 to QPSK demodulation by means of a QPSK modulation/demodulation circuit 806 and subjects the demodulated signal to error detection and correction control by means of an error control circuit 847, so that the image display apparatus 200 outputs the inter-apparatus control signal to be transmitted to the bit selection circuit 812.

The microprocessor of the image display apparatus 200 decodes the received inter-apparatus control signal and receives apparatus category information (for identifying a category indicating whether the apparatus is a display apparatus or a recording apparatus) concerning the image apparatus 100 and an apparatus identification number of the image apparatus 100 together with the transmission request signal from the image apparatus 100. Inquiry as to whether connection to the image apparatus 100 is made or not is displayed in the display screen of the image display apparatus 200 and accordingly the user issues an instruction for permitting the connection in response to the displayed inquiry by means of an input device such as a remote-control device of the image display apparatus 200. Then, mutual apparatus category information and identification numbers for identifying mutual apparatuses are exchanged between the image apparatus 100 and the image display apparatus 200 and information for observing the protection of copyright for content and restriction conditions of copy is also exchanged, so that when there is no problem, mutual connection is permitted. When the mutual apparatuses are input-only apparatus or when connection has no meaning as in case of an output-only apparatus or when the protection of copyright for content or restriction conditions of copy are violated, connection is stopped and indication to that effect is displayed in the respective apparatuses. The following description is made to the case where there is no problem in regard to the protection of copyright for content and the restriction conditions of copy.

Two bits from the most significant bit (MSB) of the picture signal among picture signal, audio signal and control signal indicating protection of copyright for content and restriction conditions of copy relative to the signals are selected and control bit for error detection and correction is added to the two bits by an error control circuit 841 to be transmitted to a QPSK modulation/demodulation circuit 801. The QPSK modulation/demodulation circuit 801 subjects this signal to QPSK modulation and sends out the radio signal from the antenna 81. An error control circuit 842 adds control bit for error detection and correction to remaining bits from third to eighth bits to be transmitted to a 64-QAM modulation/demodulation circuit 802. This signal is subjected to 64-QAM modulation by the 64-QAM modulation/demodulation circuit 802 to be transmitted from the antenna 82 as a radio signal.

In the image display apparatus 200, the QPSK modulation/demodulation circuit 804 subjects the signal received by the antenna 84 to QPSK demodulation and an error control circuit 845 subjects the signal to error control. Then, the higher-order two bits of the picture signal is supplied to the bit control circuit 812. A 64-QAM modulation/demodulation circuit 805 subjects the remaining signal received by the antenna 85 to 64-QAM demodulation and an error control circuit 846 subjects the signal to error control. Then, the signal is supplied to the bit control circuit 812.

The inter-apparatus control signal is now described. When the inter-apparatus control signal is transmitted in the down direction, that is, from the image display apparatus 200 to the image apparatus 100, the inter-apparatus control signal is transmitted from the bit selection circuit 812 through the error control circuit 847 to the QPSK modulation/demodulation circuit 806, in which the signal is modulated to be outputted from the antenna 86. The image apparatus 100 receives the signal by the antenna 83 to be supplied to the QPSK modulation/demodulation circuit 803, in which the signal is subjected to QPSK demodulation and the demodulated signal is subjected to error detection and correction by the error control circuit 843 to be transmitted to the bit selection circuit 811. To the contrary, when the inter-apparatus control signal is transmitted in the up direction, that is, from the image apparatus 100 to the image display apparatus 200, the inter-apparatus control signal is transmitted from the bit selection circuit 811 through the error control circuit 843 to the QPSK modulation/demodulation circuit 803, in which the signal is modulated to be outputted from the antenna 83. The image display apparatus 200 receives the signal by the antenna 86 to be supplied to the QPSK modulation/demodulation circuit 806, in which the signal is subjected to QPSK demodulation and the demodulated signal is subjected to error detection and correction by the error control circuit 847 to be transmitted to the bit selection circuit 812. By configured as above, the apparatuses can effectively reduce malfunction for the inter-apparatus control signal important in construction of the system even in circumstances having increased noise.

In the configuration of the embodiment, the higher-order two bits of the digital signal can be transmitted with excellent noise-resistant performance although the transmission rate thereof is low. That is, two bits of the picture signal are taken out in order from the most significant bit (MSB) thereof by utilizing the fact that higher bits of the picture signal greatly influences the picture quality and the transmission path using the QPSK modulation is assigned to the information to reduce deterioration of the picture quality. Incidentally, in the system in which audio information is more important than picture information, the transmission path using the QPSK modulation can be assigned to two important bits (for example, high 2 bits) of the audio signal.

Moreover, when man recognizes a picture, there is a tendency of being relatively unconcerned about the high frequency components in the horizontal and vertical directions of the picture screen as compared with the low frequency components thereof. Further, man's eyes tend not to follow quick motion of an object moving on the picture screen. The tendencies may be utilized to divide the frequency components in the horizontal direction of the picture screen into the low frequency components and the high frequency components, so that the QPSK modulation may be used for the low frequency components and the 64-QAM modulation may be used for the high frequency components. By doing so, noise tolerance is enhanced for important information, so that the whole transmission capacity can be ensured in the limited transmission band. Similarly, the frequency components in the vertical direction of the picture screen may be also divided into the low frequency components and the high frequency components, so that the QPSK modulation may be used for the low frequency components and the 64-QAM modulation may be used for the high frequency components. Thus, noise tolerance is enhanced for important information, so that the whole transmission capacity can be ensured in the limited transmission band. Treatment of the frequency components in the horizontal direction of the picture screen can be combined with that in the vertical direction, so that noise tolerance can be enhanced for desired important information.

In the foregoing description, the error control circuits 841, 842 and 843 add error control information to bits inputted thereto, although bits inputted to the error control circuits 841, 842 and 843 may be treated as one word, so that error control information may be added to this one word. By configured thus, the error control circuit can be formed simply.

In the configuration shown in FIG. 8, for example, a plurality of still pictures photographed by the image apparatus 1 are switched at predetermined periods of one second, for example, to be transmitted to the image display apparatus 200 or the image apparatus 2, so that the plurality of transmitted still pictures can be displayed in the image display apparatus 200 or the image display 2. The image display apparatus 200 or the image display 2 transmits a picture request signal for transmitting picture to the image apparatus 1, so that the image apparatus 1 switches the plurality of still pictures to transmit the still picture to the image display apparatus 200 or the image apparatus in response to the picture request signal. By configured thus, when the picture cannot be reproduced by the image display apparatus 200 or the image apparatus 2, the picture request signal is transmitted to the image apparatus 1 again, so that the transmission can be repeated until the picture can be received correctly. Even in this case, the picture request signal uses the QPSK modulation and accordingly noise-resistant performance is satisfactory.

Figure 10:
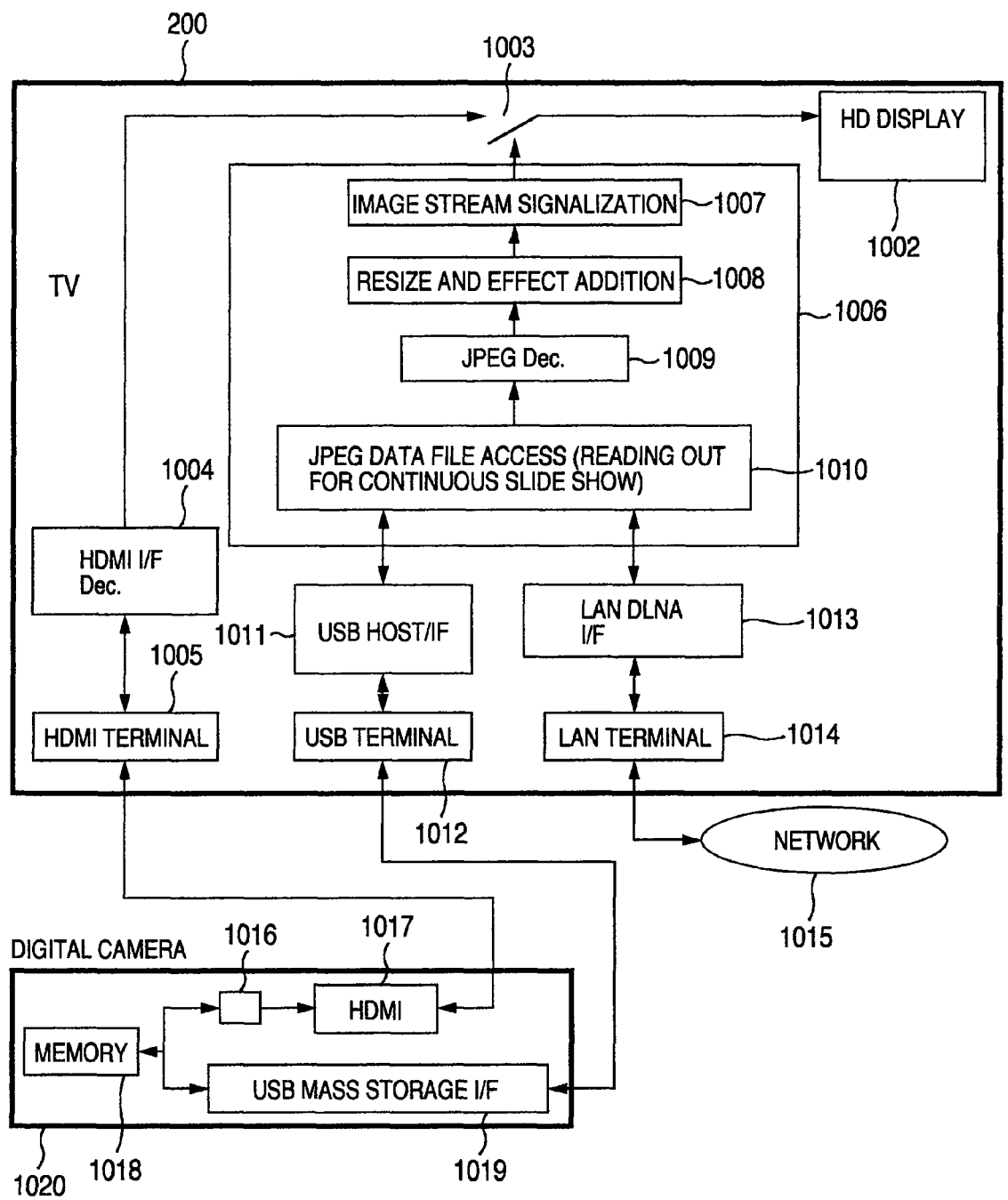
FIG. 10 schematically illustrates an embodiment of an image display apparatus according to the present invention.

Referring now to FIG. 10, an embodiment for getting a picture from the image apparatus 1 by means of the picture request signal to display it in the display apparatus is described. In the embodiment, the plurality of still pictures photographed by the image apparatus 1 are switched to be displayed in the image display apparatus 200 by way of example, although the pictures may be displayed in the image apparatus 2 similarly.

FIG. 10 illustrates an embodiment of the display apparatus constructed to display still pictures from the image apparatus 1. In this embodiment, a television display apparatus having a high definition (HD) display 1002 is used as the display apparatus. In FIG. 10, an image apparatus 1020 is concretely digital camera, mobile telephone, game machine, personal medium player or the like. In the embodiment, the image apparatus 1020 transmits still pictures to the image display apparatus 200 (television display apparatus) through two interfaces. One is HDMI for transmitting still picture as baseband picture information and the other is USB (Universal Serial Bus) for transmitting still picture as compressed picture information. The compressed picture information transmitted by USB is supposed to be compressed in JPEG format.

Configuration and operation of the image apparatus 1020 are first described. When the image apparatus 1020 transmits still picture of compressed picture information, the image apparatus 1020 reads out still picture compressed in JPEG format from a memory 1018 formed by a flash memory, for example. The still picture is supplied to a USB terminal 1012 constituting a first input device of the image display apparatus 200 from a USB mass storage interface circuit 1019 without performing signal processing such as extension processing.

On the other hand, when the image apparatus 1020 transmits still picture of baseband picture information, the image apparatus 1020 first reads out the still picture from the memory 1018. Since the still picture is compressed in the JPEG format, the still picture is subjected to signal processing for extending the compressed picture by means of a signal processing circuit 1016 to produce baseband picture information. The baseband picture information is transmitted from HDMI interface circuit 1017 to HDMI terminal 1005 constituting a second input device of the image display apparatus 200.

Then, configuration and operation of the image display apparatus 200 is described. The still picture of compressed picture information inputted to the USB terminal 1012 constituting the first input device is supplied to an image processing circuit 1006 through a USB host interface circuit 1011. The image processing circuit 1006 includes JPEG data file access circuit 1010, JPEG decoder circuit 1009, resize and effect addition circuit 1008 and image stream signalization circuit 1007. The still picture inputted to the USB terminal 1012 is supplied to the JPEG decoder circuit 1009 through the JPEG data file access circuit 1010, in which the still picture compressed in the JPEG format is decoded, that is, extended. The extended still picture is supplied to the resize and effect addition circuit 1008 to change the display size (numbers of pixels in horizontal and vertical directions) and is subjected to desired effect processing (for example, rotation processing). The still picture subjected to change of size and the like by the resize and effect addition circuit 1008 is converted into a picture signal for display by the image stream signalization circuit 1007 and is supplied to the HD display 1002 through a switching circuit 1003. Thus, the compressed still picture inputted through the USB host interface circuit 1011 is displayed in the HD display 1002.

In the embodiment, the first input device to which the compressed picture information is inputted includes LAN terminal 1014 capable of being connected to various network 1015 such as radio LAN, wired LAN and Internet. Accordingly, in the embodiment, the compressed picture can be obtained through not only USB interface but also network 1015. The compressed picture information inputted to the LAN terminal 1014 is supplied to the image processing circuit 1006 through LAN and DLNA (Digital Living Network Alliance) interface circuit. The processing in the image processing circuit 1006 is the same as the processing to the compressed picture information inputted through the USB terminal 1012 as described above and repeated description thereof is omitted.

On the other hand, the still picture of baseband picture information inputted to the HDMI terminal 1005 constituting the second input device is subjected to predetermined decode processing (encryption release processing) by means of HDMI interface/decoder circuit 1004. The still picture subjected to the encryption release processing is supplied to the HD display 1002 through the switching circuit 1003 and is displayed in the HD display 1002.

The switching circuit 1003 selects any one of the still picture inputted to the HDMI terminal 1005 and the still picture inputted to the USB terminal or LAN terminal 1014 to be supplied to the HD display 1002 and is controlled by operator's operation of the remote-control device for the image display apparatus 200, for example. Accordingly, the user can select the compressed picture information or baseband picture information in accordance with user's desire to display it in the HD display 1002.

In the embodiment, HDMI and USB interfaces are used as the interfaces for connecting to the image apparatus 1020, although interfaces having other standards may be used.

Supplementary description is made to the HDMI interface before operation of the embodiment based on the image request signal is described. FIG. 16 shows a configuration example of the HDMI interface composed of transmission and receiving sides mainly. The transmission side includes a transmission part 1601 and a transmission side control part 1603 for controlling the transmission part 1601. The transmission part 1601 encodes picture signals (Y, Pb and Pr) and audio signal to be outputted to the receiving part 1604.

Moreover, the transmission part 1601 includes TMDS (Transition Minimized Differential Signaling) encoder circuit 1602, which converts the picture signals (Y, Pb and Pr) and the audio signal into serial picture data and serial audio data, respectively. On the other hand, the receiving side includes a receiving part 1604 and a receiving side control part 1606 for controlling the receiving part 1604. The receiving part 1604 decodes the picture data and the audio data transmitted from the transmission part 1601 by TMDS decoder 1605 to reproduce baseband picture data and audio data. A CEC line 1607 constitutes an apparatus control line for transmitting control signal for apparatus and display specification information named DDC (Display Data Channel) is transmitted through DDC line 1608. Further, the receiving side transmits HPD (Hot Plug Detect) signal 1609 indicating that transmission-side apparatus is connected to receiving side apparatus.

Figure 18:
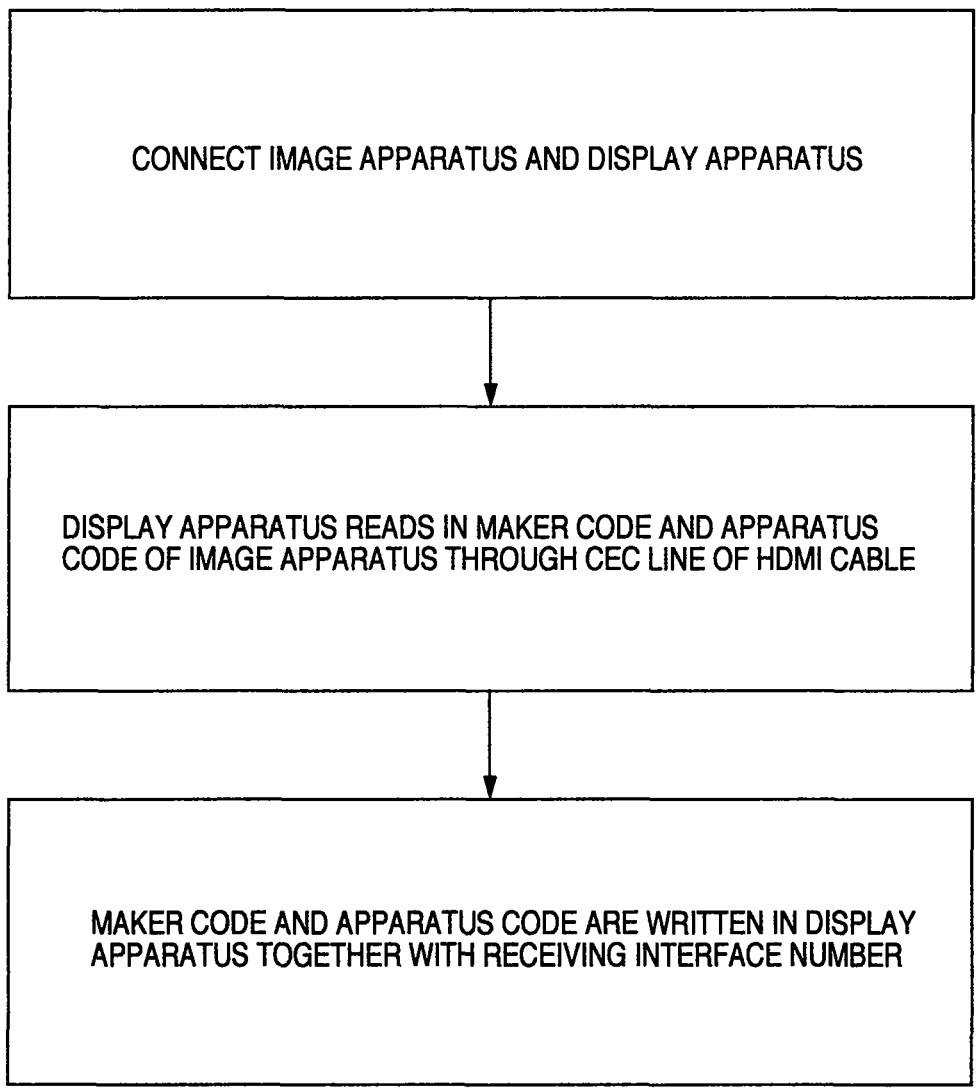
FIG. 18 is a flowchart showing an example of a method of transmitting the remote-control code by CEC (Consumer Electronics Control) line.

FIG. 17 shows an example of a format of a remote-control code transmitted through the CEC line 1607. As shown in FIG. 17, the remote-control code is of 48-bit length and includes a maker code of 16 bits for identifying a maker and an apparatus code of 12 bits for identifying an apparatus such as an apparatus kind number and a manufacture's serial number of the apparatus. The format of the remote-control code may be any format except FIG. 17. Furthermore, the remote-control code is not limited to 48-bit length and may be of any bit length. Next, an example of the method of transmitting the remote-control code through the CEC line is described with reference to FIG. 18. First, when the image apparatus is connected to the display apparatus, the HPD signal 1609 indicating that the image apparatus has been connected to the display apparatus is transmitted from the display apparatus to the image apparatus. Then, the display apparatus 200 reads in the maker code and the apparatus code of the image apparatus through the CEC line 1607 of HDMI cable. The read-in maker code and apparatus code are stored in the display apparatus 200 together with a receiving interface number. The maker code and the apparatus code may be stored in memory of microcomputer not shown, for example, of the display apparatus 200. When another HDMI cable is connected, the HDMI cable is subjected to the same processing, in which the maker code and the apparatus code thereof are stored in the display apparatus together with a receiving interface number. The read-in maker code and apparatus code are stored as a table shown in FIG. 19. By configured thus, even when makers of the display apparatus 200 and the image apparatus 1020 connected to each other are different, for example, communication therebetween can be established with reference to the stored maker code and apparatus code, so that the image apparatus 1020 can control the display apparatus 200 and the display apparatus 200 can transmit display specification information (DDC) to the image apparatus 1020.

Returning to FIG. 10 again, operation of the embodiment based on the image request signal is described. In FIG. 10, the user operates the input device such as remote-control device and keyboard of the image display apparatus 200, so that the input device issues a control command to change the mode to a display mode for displaying the still picture as described above. In accordance with the control command, the JPEG data file access circuit 1010 of the image display apparatus 200 transmits the image request signal so that the still picture of compressed picture information is outputted to the external image apparatus 1020 through the USB host interface circuit 1011 and the USB terminal 1012. In other words, in this example, the JPEG data file access circuit 1010 functions as a transmission part for transmitting the image request signal to the external image apparatus 1020. The image request signal is transmitted at predetermined intervals (for example, at intervals of one second) from the image display apparatus 200 to the image apparatus 1020. The image apparatus 1020 outputs the still picture data stored in the memory 1018 through the USB mass storage interface circuit 1019 in response to the image request signal. The USB host interface circuit 1011 takes in the still picture data from the USB terminal 1012. Thereafter, the JPEG decoder circuit 1009 decodes the read-in JPEG data to be restored to original picture data. The picture data is subjected to resize and effect processing by means of the resize and effect addition circuit 1008 to be converted into the picture signal for display by the image stream signalization circuit 1007 and be displayed in the HD display 1002.

The processing from the transmission of the image request signal to the conversion processing of the picture signal for display by the image stream signalization circuit 1007 is repeated at predetermined intervals (for example, one second) to thereby perform the picture display method named a slide show of changing over a plurality of still pictures obtained from the image apparatus 1020 at predetermined intervals and displaying them. It is a matter of course that the interval is not limited to one second and may be any intervals and can be changed properly by the user by means of the input device. The image request signal may be outputted repeatedly until all still pictures are read out from the image apparatus 1020, although a predetermined period (for example, ten second to one minute) may be defined and the image request signal may be transmitted at predetermined intervals during the predetermined period.

Furthermore, the microcomputer (not shown) of the image display apparatus 200 can also transmit the image request signal to the image apparatus 1020 through the HDMI interface/decoder circuit 1004 and the HDMI terminal 1005. In this case, since the HDMI interface is an interface of transmitting moving picture, moving picture which is not changed temporally is transmitted as far as there is no specified control.

First, the user operates the input device such as remote-control device and keyboard of the image display apparatus 200 to output the control command from the input device so that the mode is changed to the display mode. The HDMI interface/decoder circuit 1004 transmits the image request signal to the image apparatus 1020 through the CEC line of the HDMI terminal 1005 in response to the control command. That is, in this example, the HDMI interface/decoder circuit 1004 functions as the transmission part for transmitting the image request signal to the external image apparatus 1020. The image request signal is transmitted from the image display apparatus 200 to the image apparatus 1020 at predetermined periods (for example, at intervals of one second) during several seconds to one minute, for example, in the same manner as above. The image apparatus 1020 converts still picture data stored in the memory 1018 into a signal format displayable as moving picture by means of the signal processing circuit 1016 in response to the image request signal to be outputted through the HDMI interface circuit 1017.

The image display apparatus 200 receives the data through the HDMI terminal 1005 and the HDMI interface/decoder circuit 1004 to be displayed in the HD display. This processing is performed repeatedly at predetermined intervals, so that the picture display named a slide show can be performed similarly. The time interval may be changed properly by the user. The image request signal may be outputted repeatedly until all still pictures are read out from the image apparatus 100 or the image request signal may be transmitted at predetermined intervals during a predetermined period as described above.

Furthermore, the method of displaying the picture information from the image apparatus 1020 in the image display apparatus 200 has been described so far, although even when the picture information exists in the network 1015, the slide show display can be performed in the same manner. In this case, the JPEG data file access circuit 1010 of the image display apparatus 200 receives the control command from the input device and transmits it to the network 1015 through the LAN and DLNA interface circuit 1013 and the LAN terminal 1014. At this time, an address (for example, IP address) in the network of the image apparatus connected to the network is added to the image request signal. The picture signal corresponding to the address added to the image request signal is still picture data transmitted as compressed picture information responsive to the image request signal. The still picture data is supplied through the LAN terminal 1014 and the LAN and DLNA interface circuit 1013 to the JPEG decoder circuit 1009. The subsequent processing is the same as the processing for the still picture inputted to the USB terminal 1012 and accordingly repeated description thereof is omitted.

In order to realize the network function, in the embodiment, the LAN terminal 1014 and the LAN and DLNA interface 1013 are provided, although the HDMI interface or the USB interface may be expanded to have the same function.

Figure 11:
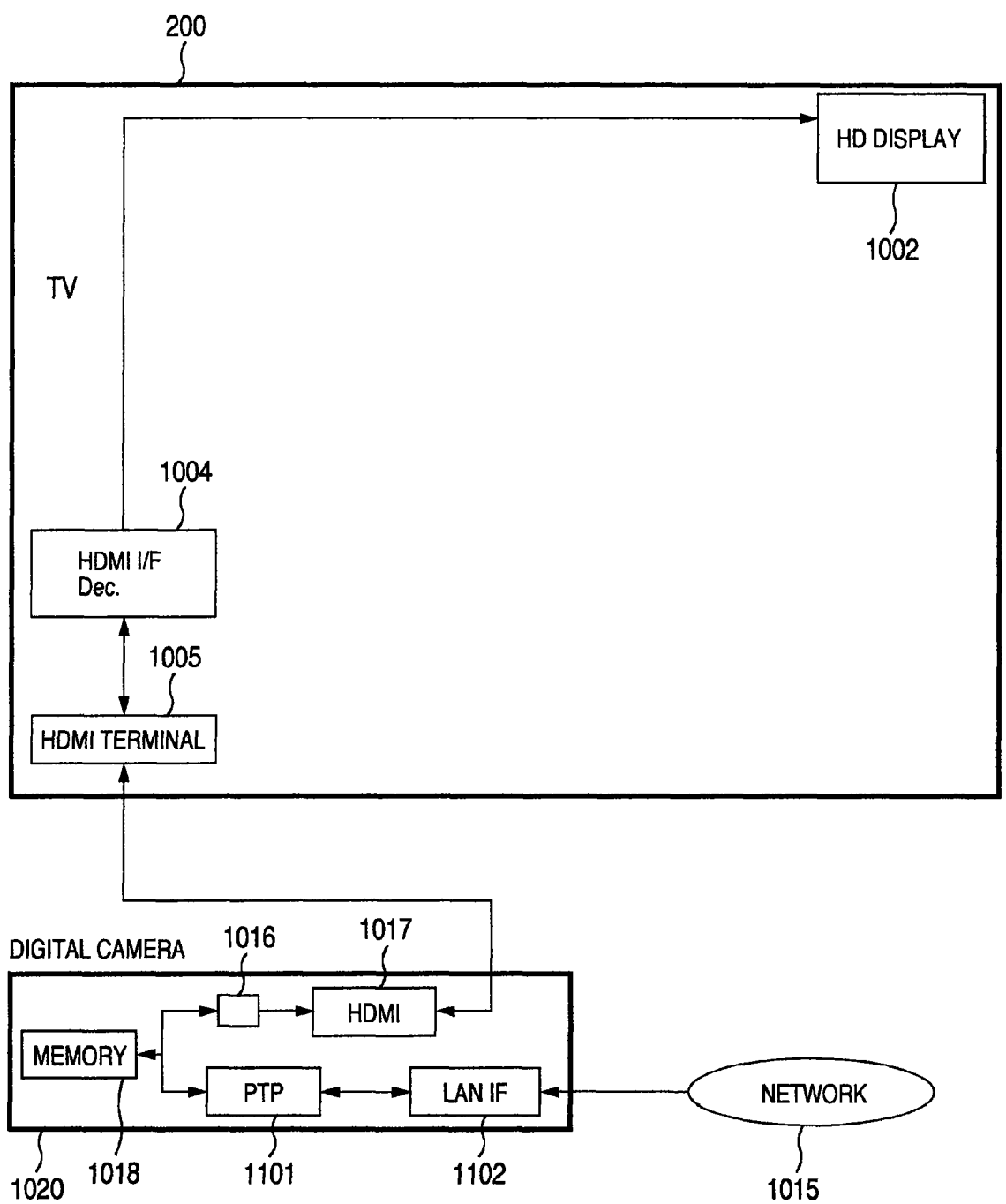
FIG. 11 schematically illustrates another embodiment of an image display apparatus according to the present invention.

FIG. 11 illustrates another embodiment according to the present invention. In FIG. 11, the same constituent elements as those shown in FIG. 10 are designated by the same reference numerals as those of FIG. 10. The configuration of FIG. 11 is different from that of FIG. 10 in that signal routes from the USB terminal 1012 and the LAN terminal 1014 in the display apparatus of FIG. 10 are deleted. Furthermore, the configuration of FIG. 11 is also different from that of FIG. 10 in that a PTP (Picture Transfer Protocol) (protocol for connecting a digital camera and a personal computer (PC) through USB to make transfer and control of picture) control circuit 1101 and a LAN interface circuit 1102 are newly provided instead of the USB mass storage interface circuit 1019 in the image apparatus 1020. Operation for the route of the HDMI terminal is the same in FIGS. 10 and 11, so that the slide show can be performed. When the configuration of FIG. 11 is used, the configuration of the display apparatus 200 is simplified and complicated connection is not required. Accordingly, user's convenience is improved. In other words, the embodiment can be applied to the configuration having only the first input device, that is, it can be applied even to the configuration in which still picture of baseband picture information is displayed. Moreover, in this example, one system of the HDMI interface is provided, although two or more systems thereof may be provided.

Furthermore, another display aspect in the image display apparatus 200 of a plurality of still pictures photographed by the image apparatus 1 is now described with reference to FIG. 10. In such a display aspect, the plurality of still pictures are displayed on a reduced scale in one picture screen of the HD display 1002 simultaneously.

Figure 12:
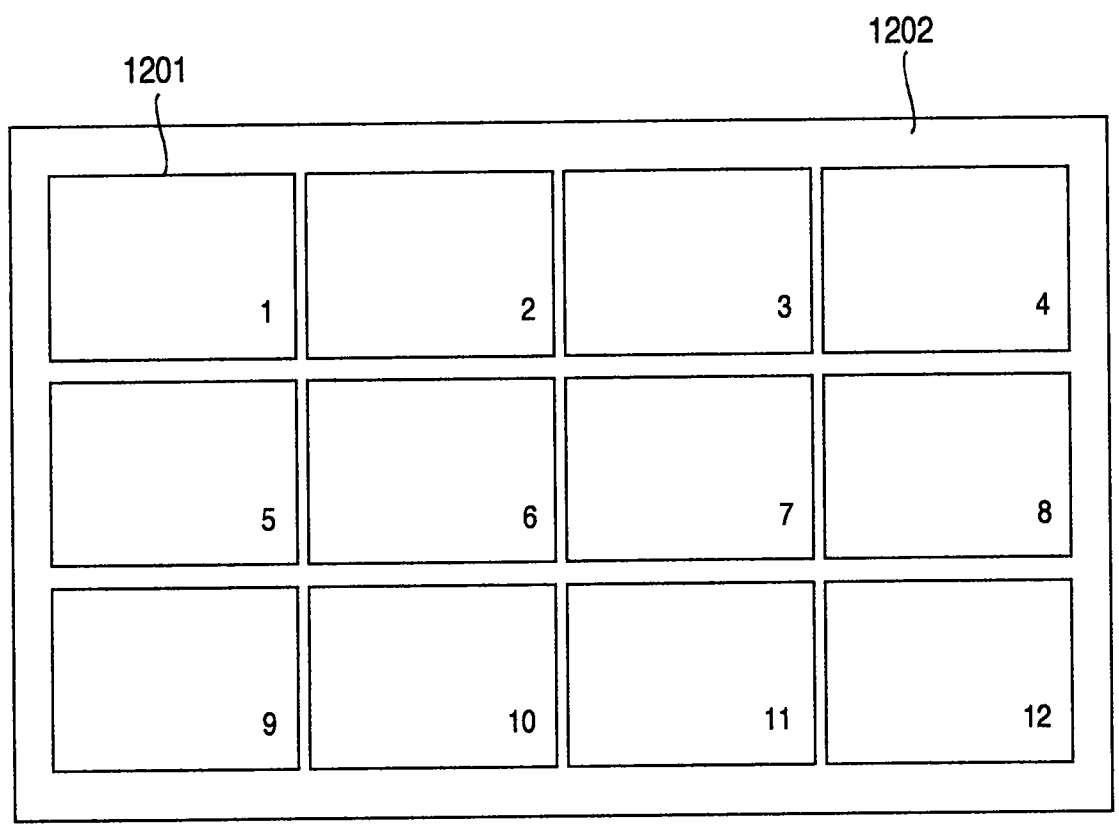
FIG. 12 shows an example of thumbnail display of the embodiment.

In FIG. 10, the JPEG data file access circuit 1010 of the image display apparatus 200 transmits an image acquirement request of still picture to the image apparatus 1020 through the USB host interface circuit 1011 and the USB terminal 1012. The image apparatus 1020 outputs still picture data of compressed picture information stored in the memory 1018 through the USB mass storage interface circuit 1019 in response to the image acquirement request. The USB host interface circuit 1011 reads in the still picture data through the USB terminal 1012. Thereafter, the JPEG decoder circuit 1009 JPEG-decodes the read-in JPEG data to restore original picture data. The resize and effect addition circuit 1008 subjects the picture data to resize and effect processing to be temporarily stored as picture in a place corresponding to a display position 1 of FIG. 12. Similarly, the JPEG data file access circuit 1010 transmits an image acquirement request of next still picture to the image apparatus 1020 through the USB host interface circuit 1011 and the USB terminal 1012. The image apparatus 1020 outputs still picture data of next compressed picture information stored in the memory 1018 through the USB mass storage interface circuit 1019 in response to the image acquirement request. The USB host interface circuit 1011 reads in the still picture data through the USB terminal 1012. Thereafter, the JPEG decoder circuit 1009 JPEG-decodes the read-in JPEG data to restore original picture data. The resize and effect addition circuit 1008 subjects the picture data to resize and effect processing to be temporarily stored as picture in a place corresponding to a display position 2 of FIG. 12. The processing from transmission of the image acquirement request to temporary storage of picture is performed repeatedly 12 times, for example, so that a plurality of still pictures named thumbnail display can be displayed together as shown in FIG. 12. This processing is performed by transmitting to the image apparatus 1020 the image acquirement requests 12 times during a predetermined period (for example, during one second or less).

When there are 12 or more still pictures in the image apparatus 1020, thumbnail display is made every 12 pictures. In such a display method, since a plurality of pictures can be viewed simultaneously, it is convenient that difference in color and subtle difference in scenes can be understood easily.

In the embodiment, in order to explain the operation simply, the single image apparatus 1020 is connected, although two image apparatuses 1020 can be connected and accordingly the two image apparatuses can be used to view 6 pictures, for example, in the respective image apparatuses in parallel simultaneously. By doing so, differences in color and brightness due to scattering of two image apparatuses 1020 and difference in photographing conditions can be confirmed and accordingly necessary picture can be selected from pictures displayed in two image apparatuses easily.

The display function can be realized even by using the configuration of FIG. 11. Operation has the same effect in FIGS. 10 and 11 and a plurality of still pictures photographed by the image apparatus 1 can be displayed together. When the configuration of FIG. 11 is used, the configuration of the display apparatus 200 is simplified and complicated connection is not required. Accordingly, user's convenience is enhanced. In this case, a memory for combining a plurality of small pictures is required, although the plurality of small pictures may be previously combined in the memory 1018 of the image apparatus 1020 and then transmitted to the image display apparatus 200 or a memory (not shown) may be provided after the HDMI interface circuit and the decoder circuit 1004 and the small pictures may be stored in the memory. Either configuration is used to attain the same effects as FIG. 10.

Figure 13:
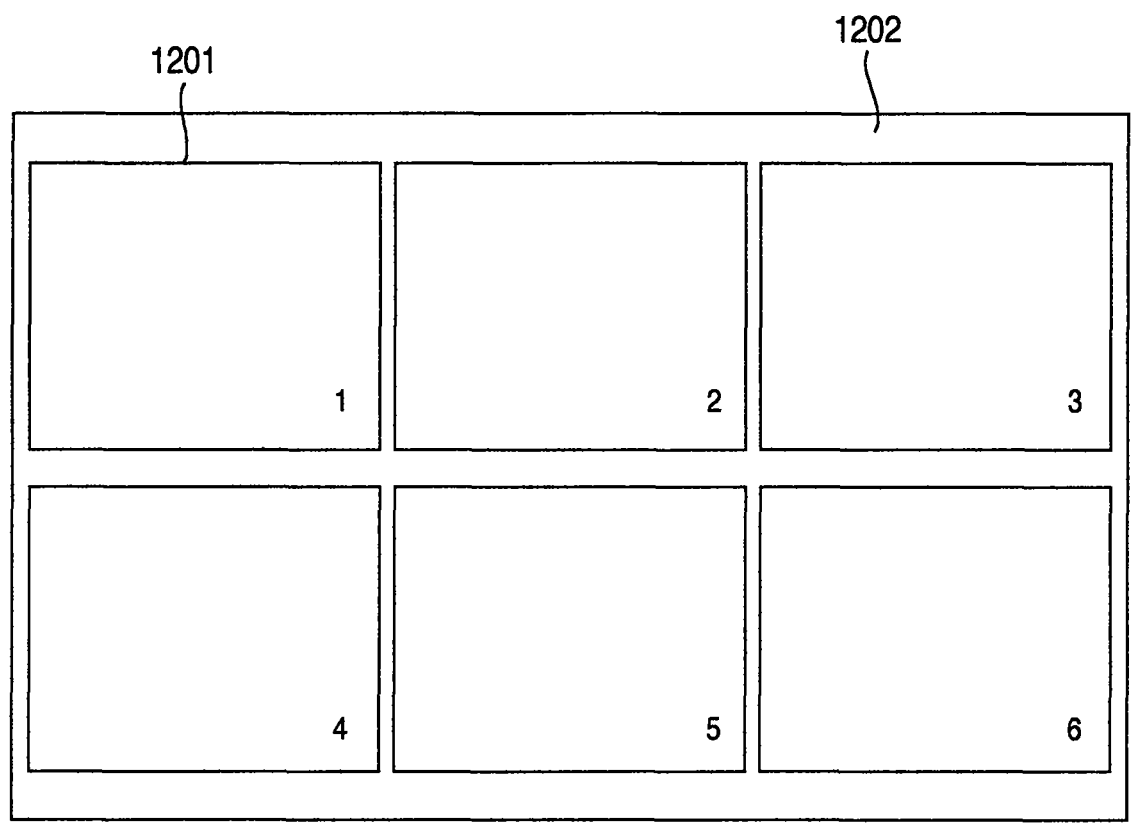
FIG. 13 shows another example of thumbnail display of the embodiment.
Figures 14, 15:
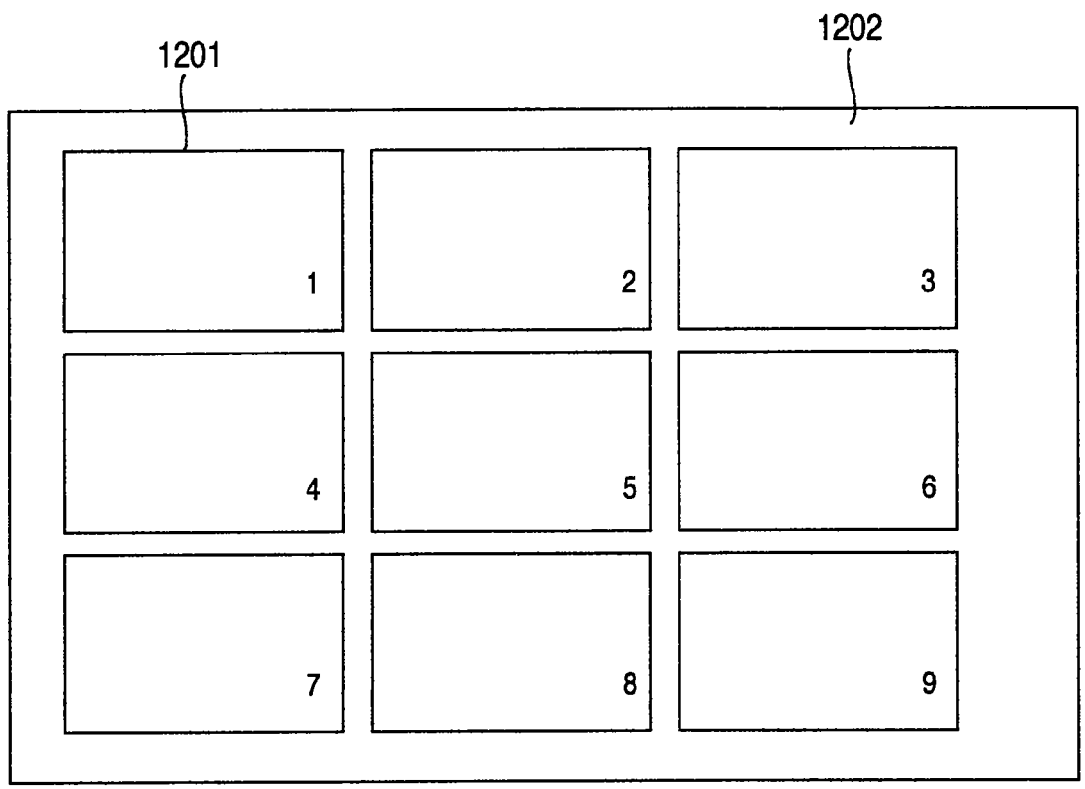
FIG. 14 shows another example of thumbnail display of the embodiment.
FIG. 15 is a table showing an example of attribute information corresponding to still pictures stored in a memory 1018 of an image apparatus 1020.

In the above description, the number of still pictures displayed simultaneously is 12, although the still pictures may be displayed in two rows in the vertical direction and in three columns in the horizontal direction as shown in FIG. 13. Furthermore, as shown in FIG. 14, the still pictures may be displayed in three rows in the vertical direction and in three columns in the horizontal direction. When the division number as shown in FIGS. 13 and 14 is used, the resolution of the HD display 1002 is 1080×1920. Accordingly, the resolution of a single small picture is about 300×500, so that difference in picture can be easily recognized. Moreover, when the small picture itself becomes smaller, flicker occurs in the picture screen, although the division of FIGS. 13 and 14 can be used to reduce the flicker. On the other hand, when pictures from a digital camera are inputted in case where the division of FIG. 12 is used, the pictures can be arranged to be displayed together in the HD display 1002 having the aspect ratio of 16:9 effectively since the aspect ratio of the pictures is substantially 4:3. Even when the pictures are arranged to be displayed together as shown in FIGS. 13 and 14, the substantially same effect can be attained, although there is an area where picture is not displayed slightly.

Attribute information such as rotation information of picture and miss-elimination preventing lock information for prevention of miss-elimination is added to the pictures stored in the memory 1018 of the image apparatus 1020. In the embodiment, the attribute information is adapted to be sent from the image display apparatus 200 through the HDMI terminal 1005 to the image apparatus 1020 by operation of remote-control device or keyboard of the image display apparatus 200 to be stored in the memory 1018. FIG. 15 shows an example of a management table of the attribute information stored in the memory 1018. As shown in FIG. 15, the attribute information concerning propriety of elimination lock and rotation angle can be added to each of the plurality of still pictures stored in the memory 1018 of the image apparatus 1020 in accordance with signal from the image display apparatus 200. In such configuration, since the apparatus directly controlled by the user is always the image display apparatus 200, the user can control miss-elimination preventing lock and rotation of picture by the same operation even if any image apparatus 1020 is connected, so that the user is not required to memorize complicated operation for each image apparatus 1020 and the convenience is improved.

Figure 9:
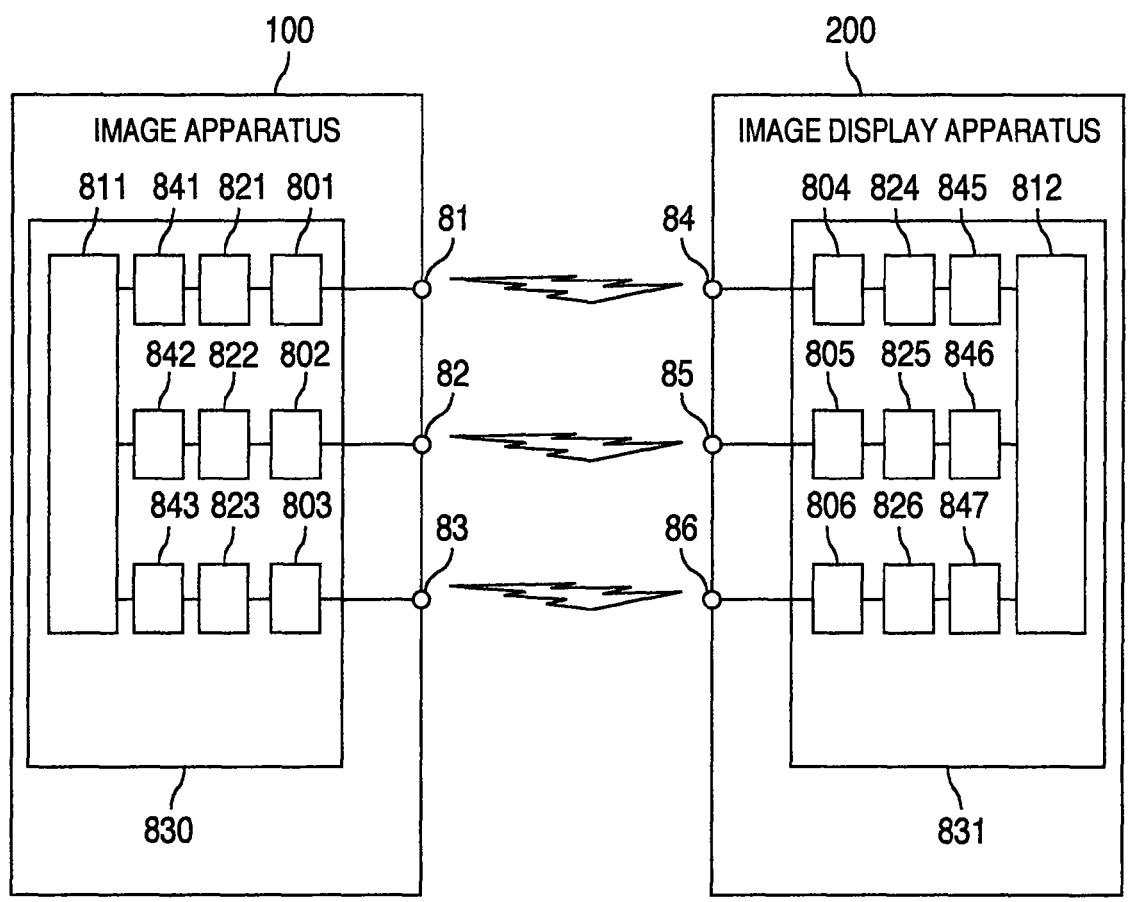
FIG. 9 is a schematic diagram illustrating another example of a system including two image apparatuses connected to each other by radio.

In the embodiment shown in FIG. 8, the encryption processing is not described in detail, although the encryption circuit 171 and the interface circuit 172 can be combined to perform processing as shown in FIG. 9. FIG. 9 illustrates an example of configuration for performing encryption processing in the system shown in FIG. 8. The system of FIG. 9 includes encryption/decryption circuits 821 to 826, interface circuits 830 and 831 containing encryption processing and error control circuits 841, 842, 843, 845, 846 and 847.

Similarly to the example of FIG. 8, in an example shown in FIG. 9, predetermined bits are selected by bit selection circuit 811 and subjected to error control by respective error control circuits 841, 842. Thereafter, the error controlled bits are subjected to encryption processing by the encryption/decryption circuits 821, 822 to be inputted to the QPSK modulation/demodulation circuit 801 and the 64-QAM modulation/demodulation circuit 802. The signals demodulated by the QPSK modulation/demodulation circuit 804 and the 64-QAM modulation/demodulation circuit 805 are inputted to the encryption/decryption circuits 824 and 825, in which the encrypted signal is decrypted. Then, the decrypted signals are subjected to bit combination by the bit selection circuit 812. By performing such processing, signal processing can be performed in accordance with importance of information and important information is difficult to mistake, so that deterioration in picture quality is reduced and the signal can be transmitted effectively.

Moreover, reversible sign can be combined with the encryption/decryption circuits 821 to 826, so that more efficient transmission can be attained. In the example shown in FIG. 9, for example, before the encryption processing is performed by the encryption/decryption circuits 821 to 823, bits to be transmitted are reduced by reversible arithmetic sign using statistical property, for example, and then the encryption processing is performed. In the image display apparatus 200, after decryption processing is performed by the encryption/decryption circuits 824 to 826, the reversible sign corresponding to the encryption/decryption circuit 821 to 823 is decrypted. Thereafter, the error control circuits 845 to 847 perform error detection and correction and the bit selection circuit 812 performs bit combination. Since the combination with the reversible signal can reduce the transmission rate of information to be transmitted, transmission can be performed efficiently.

Furthermore, supplementary description is made to encryption. When AES (Advanced Encryption Standard) 128-bit encryption processing is used for all of the encryption circuits, protection processing having high security can be performed. When AES 128-bit encryption processing is used for the content encryption circuit 821 and DES (Data Encryption Standard) encryption processing is used for other encryption circuits, the system in which protection of content important as the system is balanced with processing efficiency is configured easily.

Furthermore, transmission of baseband signal and transmission of compressed signal may be switched in accordance with the inter-apparatus control signal. By configured in this manner, when the compressed signal is transmitted in response to a request of protection of content, QPSK modulation is used to make transmission, so that transmission having excellent error tolerance in the transmission path can be attained. Further, when the baseband signal is transmitted, transmission having excellent transmission efficiency can be performed by 64-QAM modulation.

Operation of the image apparatus 100 and the image display apparatus 200 in FIG. 9 is basically the same as that of the image apparatus 100 and the image display apparatus 200 in FIG. 8. In order to make the image apparatus 100 perform transmission, first, a carrier wave detection circuit (not shown) examines whether use channels are already occupied by other apparatuses or not. Detection of carrier wave is performed by detecting whether the carrier wave exists during a predetermined period in a predetermined frequency band or not. When the carrier wave detection circuit detects that other apparatuses use the channels, the carrier wave detection circuit examines an idle state of channel again after a while. Thereafter, when the detection circuit detects that the channel is not used by other apparatus, the detection circuit notifies the microprocessor 115 of the image apparatus 100 that the channel is empty. The microprocessor 115 outputs a channel use request signal as the inter-apparatus control signal through QPSK modulation/demodulation circuit 803 to ensure the use right of channel. Then, the microprocessor 115 sends a transmission request signal to the bit selection circuit 811.

An error control circuit 843 adds error control bit for error detection and correction to the transmission request signal and the encryption/decryption circuit 823 encrypts the signal to be transmitted to the QPSK modulation/demodulation circuit 803.

The QPSK modulation/demodulation circuit 803 subjects the signal to QPSK modulation and transmits radio signal to the image display apparatus 200 through the antenna 83. On the other hand, the image display apparatus 200 subjects the radio signal received by the antenna 86 to QPSK demodulation by means of QPSK modulation/demodulation circuit 806 and encryption/decryption circuit 826 decrypts the encrypted signal. The decrypted signal is subjected to error detection and correction control by means of the error control circuit 847, so that the inter-apparatus control signal is outputted to be transmitted to the bit selection circuit 812. The microprocessor of the image display apparatus 200 decodes the received inter-apparatus control signal and receives apparatus category information (for identifying a category indicating whether the apparatus is a display apparatus or a recording apparatus) concerning the image apparatus 100 and an apparatus identification number of the image apparatus 100 together with the transmission request signal from the image apparatus 100. Inquiry as to whether connection to the image apparatus 100 is made or not is displayed in the display screen of the image display apparatus 200 and accordingly the user issues an instruction for permitting the connection in response to the displayed inquiry by means of an input device such as a remote-control device of the image display apparatus 200. Then, mutual apparatus category information and identification numbers for identifying mutual apparatuses are exchanged between the image apparatus 100 and the image display apparatus 200 and information for observing the protection of copyright for content and restriction conditions of copy is also exchanged, so that when there is no problem, mutual connection is permitted. When the mutual apparatuses are input-only apparatus or when connection has no meaning as in case of an output-only apparatus or when the protection of copyright for content or restriction conditions of copy are violated, connection is stopped and indication to that effect is displayed in the respective apparatuses. Thus, when there is no problem in the protection of copyright for content and restriction conditions of copy, connection is made and picture and audio signals are transmitted from the image apparatus 100 to the image display apparatus 200.

Embodiment 2

Figure 5:
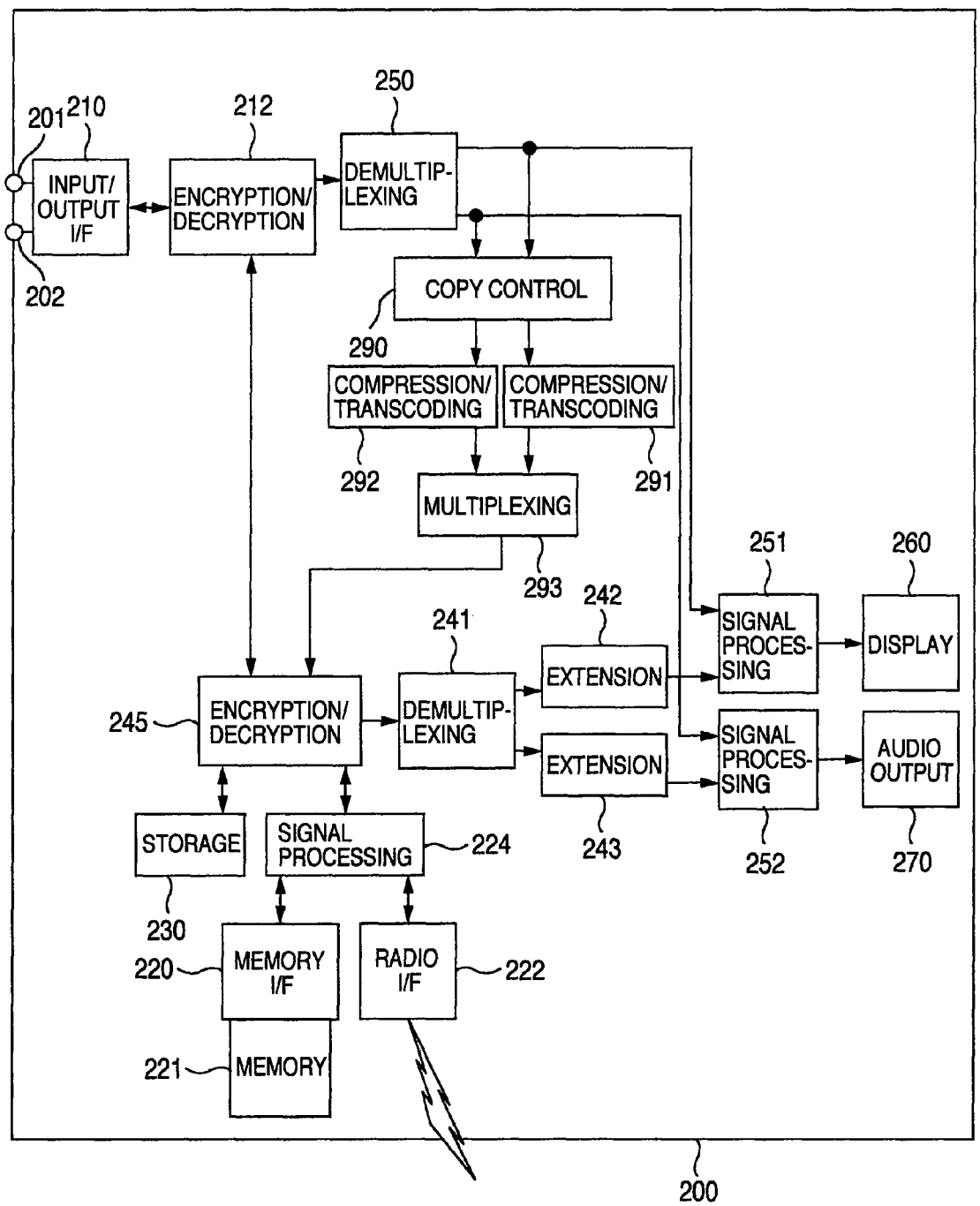
FIG. 5 is a block diagram schematically illustrating another example of an image display apparatus 200 according to an embodiment of the present invention.

FIG. 5 is a block diagram schematically illustrating an image display apparatus 200 according to a second embodiment of the present invention. FIG. 5 has part common to the embodiment shown in FIG. 4 and the elements in the common part are designated by the same reference numerals. Detailed description thereof is omitted. The image display apparatus 200 shown in FIG. 5 includes an encryption/decryption circuit 212, encryption/decryption circuits 245, 290, compression/transcoding circuit 291, 292 and a copy control circuit 293 constituting a multiplexing circuit.

In the embodiment shown in FIG. 5, when a baseband signal is inputted from terminal 201 or 202, the image display apparatus 200 operates in the same manner as the embodiment shown in FIG. 4. The compression/transcoding circuits 292, 291 operate as compression circuit for the baseband signal. When a compressed signal is inputted from the terminal 201 or 202, the signal is supplied through input/output interface 210 to the encryption/decryption circuit 212, in which encryption necessary for transmission is decrypted and the decrypted signal is divided into compressed picture signal and compressed audio signal by demultiplexing circuit 250. Both of the signals are supplied to copy control circuit 290, which judges whether copy is possible or not on the basis of information indicating whether copy is possible or not. When copy is possible, compression/transcoding circuits 291, 292 use compression system having more excellent compression efficiency to reduce bit rates of compressed picture and audio signals. Output signals of the compression/transcoding circuits 291, 292 are multiplexed by multiplexing circuit 293 to be inputted to encryption/decryption circuit 245. When the copy control circuit 290 detects that copy is permitted, the encryption/decryption circuit 245 subjects the input signal to encryption processing for storage and stores it in storage device 230 and/or memory 221. When the stored signal is reproduced, the reproduction signal from the storage device 230 or the memory 221 is decrypted by the encryption/decryption circuit 245 and is divided into picture and audio signals by the demultiplexing circuit 241. Thereafter, the picture and audio signals are subjected to the same processing as above to be viewed and listened.

Even when the signals are viewed and listened while being stored in the storage device 230 or memory 221, the signal from the multiplexing circuit 293 is inputted through the encryption/decryption circuit 245 to the demultiplexing circuit 241 to be subjected to the same processing. In this case, transcoded picture quality can be confirmed. When viewing and listening are made directly without storing, the signal is inputted from the encryption/decryption circuit 212 through the encryption/decryption circuit 245 to the demultiplexing circuit 241, in which the signal is divided into picture and audio signals to be subjected to the same processing.

In the embodiment shown in FIG. 5, even when the compressed signal is inputted, the signal can be subjected to transcoding to thereby be stored efficiently with higher compression ratio. Furthermore, in the embodiment, measures for processing the signal, including the compression circuits 111, 113 are realized by means of circuits by way of example. However, various circuit elements may be formed by software measures to realize the above processing and even in this case the same effects can be attained. The present invention does not limit how the signal processing is realized.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A display apparatus comprising:
an input device being adapted to be connected to an external image apparatus with a photographing device to take still or moving images through predetermined interface and to which a plurality of pieces of picture information which is based on the still or moving image taken with the photographing device from the external image apparatus;
a display device being adapted to display picture on the basis of the picture information supplied to the input device; and
a transmission device being adapted to transmit a picture acquisition request based on user operation with a remote control device for getting the picture information from the external image apparatus through the interface to the external image apparatus at predetermined intervals;
wherein
the input device is supplied with the plurality of pieces of picture information from the external image apparatus in response to the picture acquisition request at predetermined interval
a size changing device being adapted to change picture size of the plurality of pieces of picture information supplied to the input device, in response to the picture acquisition request transmitted plural times to produce a plurality of small pictures;
wherein the picture information supplied to the input device is compressed picture information and a combination device is adapted to combine the plurality of small pictures having the picture size changed by the picture size changing device;
a display device being adapted to display an output of the picture combination device and
wherein the predetermined interface is a radio or wired network and the compressed picture information is supplied through the network to the input device.

2. The display apparatus according to claim 1, wherein
the predetermined interface is a USB interface and the compressed picture information is supplied through the USB interface to the input device.

3. The display apparatus according to claim 1, wherein
the picture information supplied to the input device is baseband picture information.

4. The display apparatus according to claim 3, wherein
the predetermined interface is an HDMI interface and the compressed picture information is supplied through the HDMI interface to the input device.

5. The display apparatus according to claim 1, wherein
a plurality of pieces of picture information supplied to the input device are switched at the predetermined intervals to be displayed.

6. The display apparatus according to claim 1, wherein
a plurality of pieces of picture information supplied to the input device are arranged together in one picture screen of the display device to be displayed.

7. A display apparatus comprising:
a first input device being adapted to be connected to an external image apparatus through a predetermined interface and be supplied with compressed picture information from an external image apparatus with a photographing device to take still and moving images, the compressed picture information is based on the still or moving image taken with the photographing device;
a second input device being adapted to be supplied with first baseband picture information from the external image apparatus, the first baseband picture information is based on the still or moving image taken with the photographing device;
an extension device being adapted to extend the compressed picture information supplied to the first input device and produce second baseband picture information;
a display device being adapted to display any one of the first baseband picture information supplied to the second input device and the second baseband picture information produced by the extension device; and
a transmission device being adapted to transmit a picture acquisition request based on user operation with a remote control device for getting the picture information from the external image apparatus through the first or second input device to the external image apparatus at predetermined intervals;

wherein the picture information is supplied to the first or second input device from the external image apparatus in response to the picture acquisition request at predetermined intervals and the display device displays picture on the basis of a plurality of pieces of picture information supplied to the input device at the predetermined intervals;

wherein the predetermined interface is a radio or wired network, the first input device is supplied with the compressed picture information through the radio or wired network, and wherein the predetermined intervals is changeable by a user, the plurality of pieces of picture information are switched to be displayed according to the changed intervals.

8. The display apparatus according to claim 7, wherein the compressed picture information is supplied to the first input device through a USB interface.

9. The display apparatus according to claim 7, wherein the first baseband signal is supplied to the second input device through an HDMI interface.

10. The display apparatus according to claim 7, wherein the plurality of pieces of picture information supplied to the input device are switched at the predetermined intervals to be displayed.

11. The display apparatus according to claim 7, wherein the plurality of pieces of picture information supplied to the input device are arranged together in one picture screen of the display device to be displayed.

12. A display apparatus comprising:

an input device being adapted to be connected to an external image apparatus with a photographing device to take still and moving images through predetermined interface and to which a plurality of pieces of picture information which is based on the still or moving image taken with the photographing device can be supplied from the external image apparatus;

a transmission device being adapted to transmit a picture acquisition request based on user operation with a remote control device for getting the picture information from the external image apparatus through the interface to the external image apparatus plural times within predetermined period;

a picture size changing device being adapted to change picture size of the plurality of pieces of picture information supplied to the input device in response to the picture acquisition request transmitted plural times to produce a plurality of small pictures;

a picture combination device being adapted to combine the plurality of small pictures having the picture size changed by the picture size changing device; and a display device being adapted to display an output of the picture combination device, wherein the picture information supplied to the input device is compressed picture information, and wherein the predetermined interface is a radio or wired network and the compressed picture information is supplied through the network to the input device.

13. The display apparatus according to claim 12, wherein the transmission device transmits the picture acquisition request to the external image apparatus through the interface at predetermined intervals.

14. The display apparatus according to claim 12, wherein the input device includes a first input device to which compressed picture information can be supplied from the external image apparatus and a second input device to which first baseband picture information can be supplied from the external image apparatus and the picture size changing device changes picture size of any of the first baseband picture information supplied to the second input device and second baseband picture information obtained by extending the compressed picture information supplied to the first input device to produce the plurality of small pictures.

15. The display apparatus according to claim 14, wherein the compressed picture information inputted to the first input device contains rotating information at time that the picture information is displayed and rotation display performed on the basis of the rotation information is performed by controlling a connection device of the transmission device and the input device.

16. A display apparatus comprising:

an input device being adapted to be connected to an external image apparatus through predetermined interface and be supplied with compressed picture information from the external image apparatus;

a display device being adapted to display picture on the basis of the picture information supplied to the input device;

a transmission device being adapted to transmit a picture acquisition request for getting the picture information from the external image apparatus through the interface to the external image apparatus at predetermined intervals;

a size changing device being adapted to change picture size of a plurality of pieces of picture information supplied to the input device;

a combination device is adapted to combine a plurality of small pictures having the picture size changed by the picture size changing device; and a display device being adapted to display an output of the picture combination device;

wherein the input device is supplied with a plurality of pieces of compressed picture information from the external image apparatus in response to the picture acquisition request at predetermined intervals;

wherein the display device displays picture on the basis of the plurality of pieces of picture information supplied to the input device at the predetermined intervals, wherein the predetermined interface is a radio or wired network, the input device is supplied with the compressed picture information through the radio or wired network, wherein the predetermined intervals can be changed by a user, the plurality of pieces of picture information are switched to be displayed according to the changed intervals, wherein the picture information supplied to the input device is compressed picture information.

17. The display apparatus according to claim 16, wherein the predetermined interface is a USB interface and the compressed picture information is supplied through the USB interface to the input device.

18. The display apparatus according to claim 16, wherein the predetermined interface is an HDMI interface and the compressed picture information is supplied through the HDMI interface to the input device.

* * * * *